United States Patent
Park et al.

(10) Patent No.: US 10,916,049 B2
(45) Date of Patent: Feb. 9, 2021

(54) DEVICE AND METHOD FOR RENDERING IMAGE

(71) Applicant: SAMSUNG ELECTRONICS CO., LTD., Suwon-si (KR)

(72) Inventors: Gwang Woo Park, Gwangmyeong-si (KR); Ki Hun Eom, Yongin-si (KR); Jong Hoon Won, Suwon-si (KR); Jung Eun Lee, Suwon-si (KR); Sang Won Chae, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/342,229

(22) PCT Filed: Sep. 27, 2017

(86) PCT No.: PCT/KR2017/010709
§ 371 (c)(1),
(2) Date: Apr. 16, 2019

(87) PCT Pub. No.: WO2018/074761
PCT Pub. Date: Apr. 26, 2018

(65) Prior Publication Data
US 2019/0325658 A1    Oct. 24, 2019

(30) Foreign Application Priority Data
Oct. 17, 2016    (KR) .................. 10-2016-0134458

(51) Int. Cl.
*G06T 15/20* (2011.01)
*G06T 7/70* (2017.01)
(Continued)

(52) U.S. Cl.
CPC .......... *G06T 15/205* (2013.01); *G02B 27/017* (2013.01); *G06F 3/0481* (2013.01);
(Continued)

(58) Field of Classification Search
None
See application file for complete search history.

(56) References Cited

U.S. PATENT DOCUMENTS 9,424,767 B2    8/2016    Fleck et al.
9,761,039 B2    9/2017    Lee et al.
(Continued)

FOREIGN PATENT DOCUMENTS

| JP | 2016-527536 | 9/2016 |
|---|---|---|
| KR | 10-2015-0081751 | 7/2015 |
| KR | 10-2016-0011486 | 2/2016 |

OTHER PUBLICATIONS

International Search Report for PCT/KR2017/010709, dated Feb. 13, 2018, 5 pages.
(Continued)

*Primary Examiner* — Jwalant Amin
(74) *Attorney, Agent, or Firm* — Nixon & Vanderhye, P.C.

(57) ABSTRACT

An electronic device is provided. The electronic device includes a display, a communication circuit receiving first data including objects for implementing a virtual environment from a server, and a processor. The objects include a text type of first object and a non-text type of second object. The processor divides a region to be output on the display in the virtual environment into a plurality of blocks, determines at least one of the plurality of blocks as a first region based on a region where the first object is output and determines the rest of the plurality of blocks as a second region, renders the first region in a first rendering method and renders at least a portion of the second region in a second rendering method, and outputs the virtual environment on the display based on the first region and the at least portion of the second region.

15 Claims, 22 Drawing Sheets

(51) Int. Cl.
*G02B 27/01* (2006.01)
*G06F 3/0481* (2013.01)
*G06T 19/00* (2011.01)
*G06T 19/20* (2011.01)

(52) U.S. Cl.
CPC .............. *G06T 7/70* (2017.01); *G06T 19/006* (2013.01); *G06T 19/20* (2013.01)

(56) References Cited

U.S. PATENT DOCUMENTS

| | | | |
|---|---|---|---|
| 2005/0012760 A1* | 1/2005 | Yamamoto | G06T 11/60 345/636 |
| 2007/0288844 A1* | 12/2007 | Zingher | G06T 11/60 715/210 |
| 2008/0273033 A1* | 11/2008 | Brennan | G06T 15/405 345/422 |
| 2012/0032951 A1 | 2/2012 | Lee et al. | |
| 2013/0335442 A1 | 12/2013 | Fleck et al. | |
| 2014/0361977 A1 | 12/2014 | Stafford et al. | |
| 2016/0027203 A1 | 1/2016 | Lee et al. | |
| 2016/0086386 A1 | 3/2016 | Son et al. | |
| 2016/0140728 A1* | 5/2016 | Aonuma | G06F 9/453 382/103 |
| 2016/0162242 A1* | 6/2016 | Xiong | G06F 3/1431 345/5 |
| 2016/0266769 A1* | 9/2016 | Oursbourn | G06K 9/00442 |
| 2017/0161880 A1 | 6/2017 | Choi et al. | |
| 2017/0205976 A1* | 7/2017 | Kim | G06F 3/04842 |
| 2018/0314889 A1* | 11/2018 | Fukazawa | G06F 3/038 |

OTHER PUBLICATIONS

Written Opinion of the ISA for PCT/KR2017/010709, dated Feb. 13, 2018, 7 pages.

* cited by examiner

DEVICE AND METHOD FOR RENDERING IMAGE

This application is the U.S. national phase of International Application No. PCT/KR2017/010709 filed 27 Sep. 2017, which designated the U.S. and claims priority to KR Patent Application No. 10-2016-0134458 filed 17 Oct. 2016, the entire contents of each of which are hereby incorporated by reference.

TECHNICAL FIELD

The disclosure relates to technologies of rendering images.

DESCRIPTION OF RELATED ART

With the development of electronic technologies, various types of electronic products have be developed and distributed. Recently, there has been a growing interest in wearable electronic devices, each of which is wearable on a user's body. Particularly, head mounted device (HMD) devices, each of which is wearable on a user's head, have been actively developed.

Unlike a screen provided in a TV, a monitor, a movie theater, a small display may be located in an HMD device. A user may have the feeling as if he or she sees a huge screen on the display located in the HMD device. For example, a virtual reality (VR) device may output images associated with a virtual environment on the display. The user may feel the output virtual environment like a real environment and may experience events which occur in the virtual environment.

When outputting an image on the display, the above-mentioned HMD device may render and output the image. Because the rendered image is provided to the user via a lens unit, there may be a need for a rendering method considering a distortion rate of the lens unit. For example, a process (e.g., 2-pass rendering) of inversely distorting an image rendered to a plane in consideration with the distortion rate of the lens unit may be performed, or rendering (e.g., 1-pass rendering) of an image may be performed to an inverse distortion plane.

SUMMARY

Several objects may be included in an image. When a different rendering method is not performed according to objects, an error may occur in the rendering process or a time taken to perform rendering may be long. For example, for 1-pass rendering, a character may be clearly output, but an error may occur in a process of outputting a complex structure. For 2-pass rendering, an object having a complex structure may be output without an error, but a time taken to perform rendering may be long and much current consumption may occur.

Various embodiments disclosed in the disclosure provide an electronic device for addressing the above-mentioned problems and issues raised in the disclosure.

In accordance with an aspect of the disclosure, an electronic device for generating an image to be displayed through a lens unit is provided. The electronic device may include a display, a communication circuit configured to receive first data including objects for implementing a virtual environment from a server, and a processor. The objects may include a text type of first object and a non-text type of second object. The processor may be configured to divide a region to be output on the display in the virtual environment into a plurality of blocks, determine at least one of the plurality of blocks as a first region based on a region where the first object is output and determine the rest of the plurality of blocks as a second region, render the first region in a first rendering method and render at least a portion of the second region in a second rendering method, and output the virtual environment on the display based on the rendered first region and the at least rendered portion of the second region.

In accordance with another aspect of the disclosure, a storage medium may store computer-readable instructions. The instructions, when executed by an electronic device, may cause the electronic device to implement a virtual environment from a server and receive first data including objects including a text type of first object and a non-text type of second object, divide a region to be output on a display in the virtual environment into a plurality of blocks, determine at least one of the plurality of blocks as a first region based on a region where the first object is output and determine the rest of the plurality of blocks as a second region, render the first region in a first rendering method and render at least a portion of the second region in a second rendering method, and output the virtual environment on the display based on the rendered first region and the at least rendered portion of the second region.

In accordance with another aspect of the disclosure, an electronic device mounted on a head mounted display (HMD) device having a left-eye lens and a right-eye lens is provided. The electronic device may include a display, a communication interface configured to connect the HMD device and the electronic device, a communication circuit configured to obtain data for implementing a virtual environment implemented by a server in the HMD device and information associated with a behavior of an external device which accesses the virtual environment from the server, and a processor configured to divide a region to be output on the display in the virtual environment into a plurality of blocks, determine at least one of the plurality of blocks as a first region based on the information associated with the behavior and determine the rest of the plurality of blocks as a second region, render the first region and the second region in different rendering methods, and output the virtual environment on a region corresponding to the left-eye lens and a region corresponding to the right-eye lens on the display based on the rendered first region and the rendered second region.

According to embodiments disclosed in the disclosure, current consumption may be reduced and an image with high image quality may be output by dividing a region to be output on a display into a plurality of blocks and rendering the divided blocks using different rendering methods.

In addition, various effects directly or indirectly ascertained through the disclosure may be provided.

DETAILED DESCRIPTION OF EXAMPLE EMBODIMENTS

Figure 1:
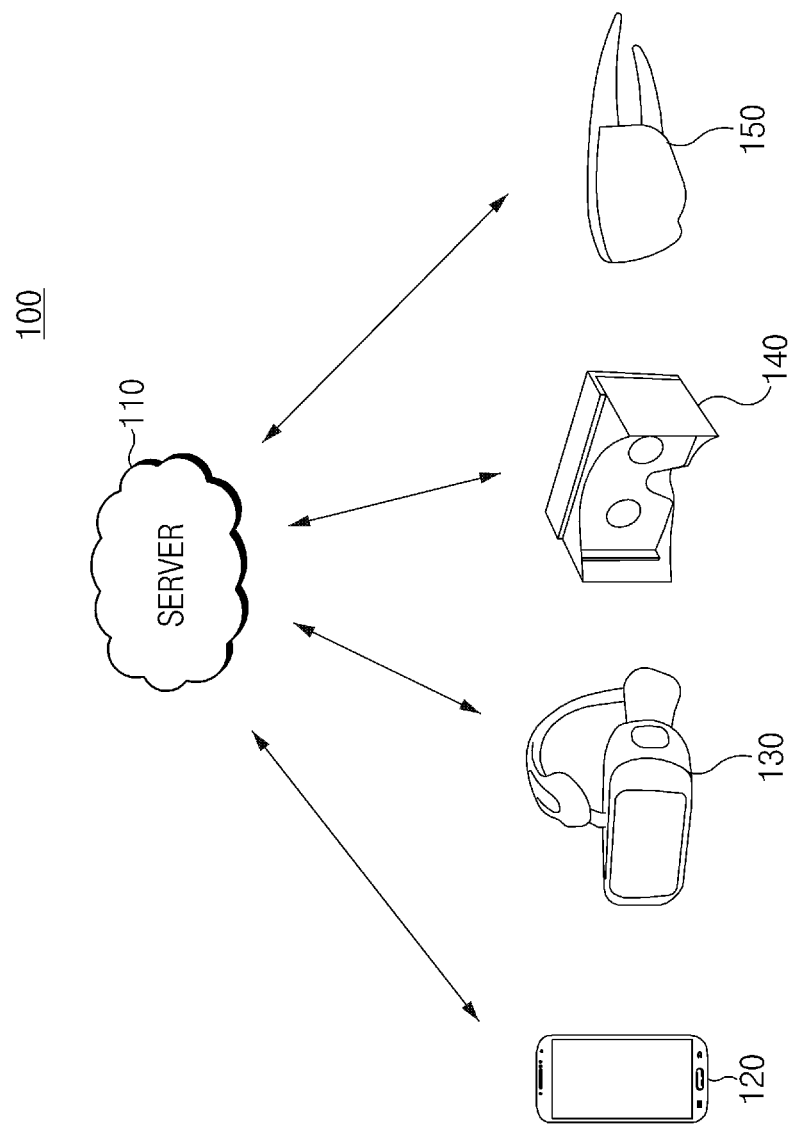
FIG. 1 illustrates a network environment, according to various embodiments.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 illustrates a network environment 100, according to various embodiments.

Referring to FIG. 1, a server 110 may be connected with electronic devices 120, 130, 140, and 150 to transmit/receive data with the electronic devices 120, 130, 140, and 150. For example, the server 110 may transmit data, received from the first electronic device 120, to the second to fourth electronic devices 130 to 150. The server 110 may store data received from the electronic devices 120, 130, 140, and 150 and may change data received from the electronic devices 120, 130, 140, and 150. For example, the server 110 may change an image captured by the fourth electronic device 150 in the form of data executable by the second electronic device 130 and may transmit the changed data to the second electronic device 130.

The first to fourth electronic devices 120 to 150 may be electronic devices capable of transmitting/receiving data with the server 110 or another electronic device. For example, the first electronic device 120 may be a mobile device, the second electronic device 130 may be a high performance HMD device, the third electronic device 140 may be a poor performance HMD device, and the fourth electronic device 150 may be an augmented reality (AR) device. The first to fourth electronic devices 120 to 150 are not limited to the examples shown in FIG. 1 and may be referred to as electronic devices different from the electronic devices shown in FIG. 1.

The first to fourth electronic devices 120 to 150 may be connected with each other via the server 110. The first to fourth electronic devices 120 to 150 may transmit/receive data necessary for another electronic device via the server 110. For example, an image captured by the fourth electronic device 150 may be transmitted to the first to third electronic devices 120 to 140 via the server 110.

Figure 2:
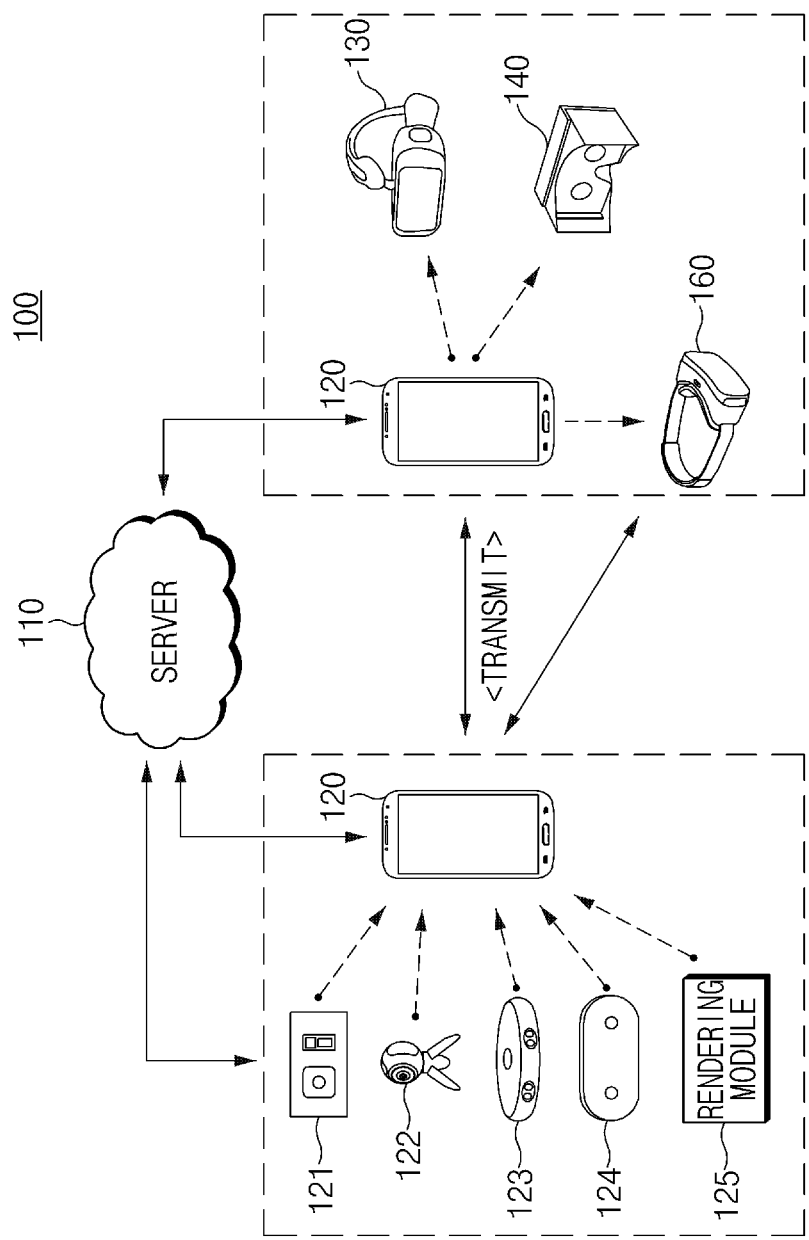
FIG. 2 illustrates devices which are connected to an electronic device in a network environment to generate different types of data, according to various embodiments.

FIG. 2 illustrates devices which are connected to an electronic device in a network environment 100 to generate different types of data, according to various embodiments.

Referring to FIG. 2, a first electronic device 120 may be connected with data generating devices 121 to 125 and may transmit data, received from the data generating devices 121 to 125, to a server 110. For example, the first electronic device 120 may be connected with the camera 121, the 360-degree camera 122, the stereo camera 124, the 360-degree stereo camera 123, the rendering device 125, or the like. The first electronic device 120 may transmit a photo, a video, or the like, received from the camera 121, the 360-degree camera 122, or the like, to the server 110. The first electronic device 120 may receive a rendered photo, image, or the like from the rendering module 125 to transmit the received photo, image, or the like to the server 110. In FIG. 2, the camera 121, the 360-degree camera 122, the stereo camera 124, the 360-degree stereo camera 123, the rendering device 125, or the like is shown as being connected with the first electronic device 120, but may be included in the first electronic device 120.

The first electronic device 120 may output be mounted the HMD device 130 or 140 to output an image. For example, the first electronic device 120 may be mounted on the high performance HMD device 130 or the poor performance HMD device 140 to output a virtual environment on a region corresponding to a left-eye lens of the HMD device 130 or 140 or a region corresponding to a right-eye lens. When the virtual environment is output on the first electronic device 120, a user of the HMD device may view the virtual environment through a lens included in the HMD device.

The server 110 may connected with the first electronic device 120 to transmit/receive data. The server 110 may be directly connected with the data generating devices 121 to 125 to transmit/receive data. For example, the server 110 may be connected with the 360-degree camera 122 to receive a photo, an image, or the like captured by the 360-degree camera 122. The server 110 may store data received from the first electronic device 120 or the data generating devices 121 to 125 and may change the received data in a form executable by another electronic device. Furthermore, the server 110 may transmit the received data to another electronic device.

Figure 3:
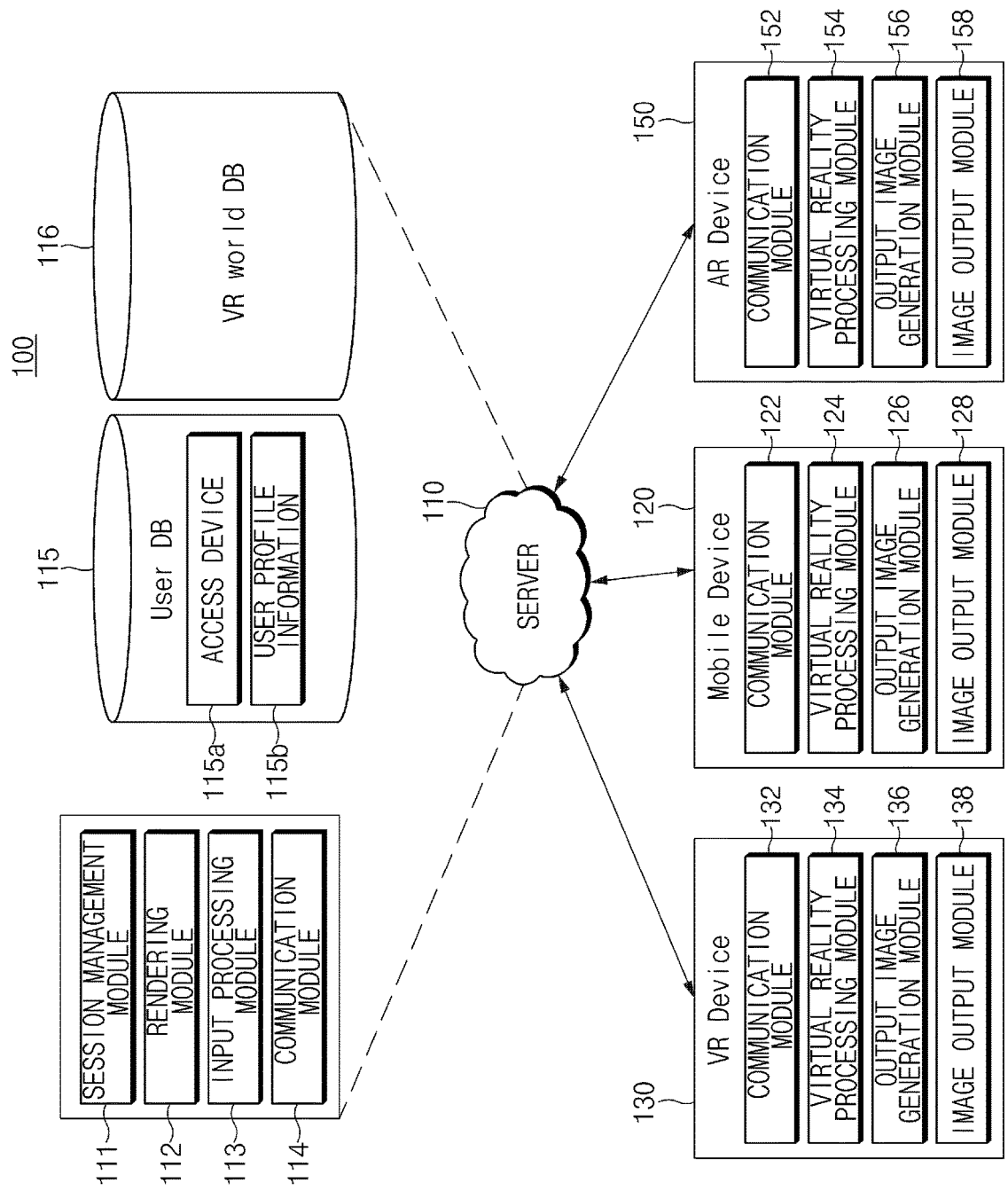
FIG. 3 is a block diagram illustrating respective components of electronic devices included in a network environment, according to various embodiments.

FIG. 3 is a block diagram illustrating respective components of electronic devices included in a network environment 100, according to various embodiments.

Referring to FIG. 3, a server 110 may include a session management module 111, a rendering module 112, an input processing module 113, a communication module 114, a user DB 115, and a VR world DB 116. The user DB 115 may include an access device 115a and user profile information 115b. The session management module 111 may manage devices which access the server 110. The rendering module 112 may include a voice rendering module and an image rendering module. The voice rendering module may render a sound played by an electronic device. The image rendering module may render a screen to be displayed on the electronic device (e.g., a first electronic device 120) and may provide the rendered image to the electronic device. The input processing module 113 may change data received from the electronic device (e.g., the first electronic device 120). The communication module 114 may receive data from the electronic device (e.g., the first electronic device 120) and may transmit the rendered voice or image data.

The user DB 115 may include a type of a device which may access the server 110, a type of a device which accesses the server 110, profile information of a user who accesses the server 110, or the like. The VR world DB 116 may store data or the like necessary for the virtual environment 100. For example, when the virtual environment is a meeting room, the VR world DB 116 may store meeting materials or the like.

The mobile device 120 (or the first electronic device 120), a VR device (or a second electronic device 130), or an AR device 150 (or a fourth electronic device 150) may include communication modules 122, 132, 152, virtual reality processing modules 124, 134, and 154, output image generation modules 126, 136, and 156, and image output modules 128, 138, and 158, respectively. The communication module 122, 132, or 152 may transmit/receive data from the server 100, and the virtual reality processing module 124, 134, or 154 may transform data received from the server 110 into a form executable in the electronic device. The output image generation module 126, 136, or 156 may execute the data transformed by the virtual reality processing module 124, 134, or 154 to output the data via the image output module 128, 138, or 158.

Figure 4:
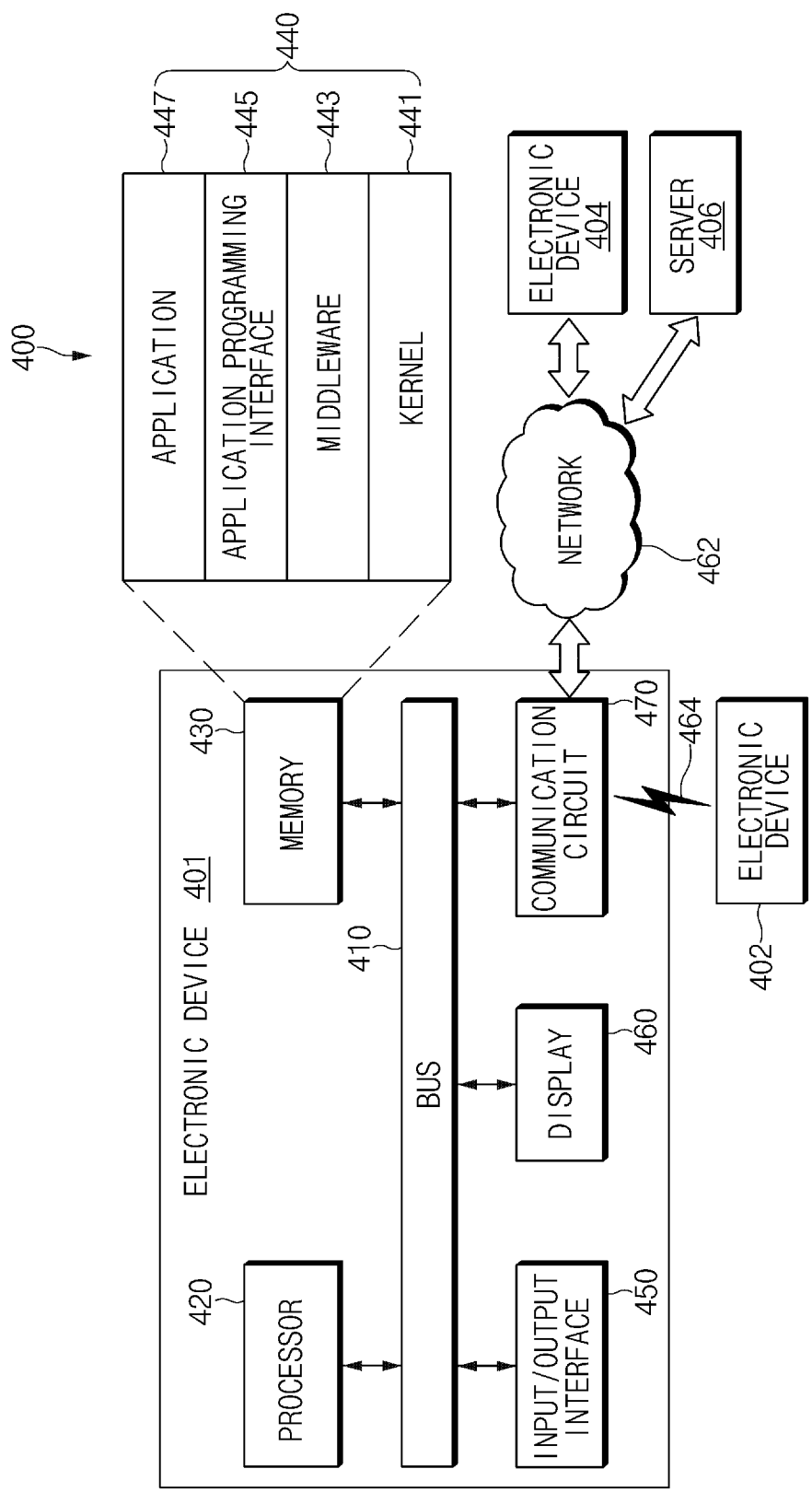
FIG. 4 illustrates an electronic device in a network environment system, according to various embodiments.

FIG. 4 illustrates an electronic device in a network environment system, according to various embodiments.

Referring to FIG. 4, according to various embodiments, an electronic device 401 (e.g., the mobile 120 of FIG. 3), a first electronic device 402, a second electronic device 404, or a server 406 (e.g., the server 110 of FIG. 1) may be connected each other over a network 462 or a short range communication 464. The electronic device 401 may include a bus 410, a processor 420, a memory 430, an input/output interface 450, a display 460, and a communication circuit 470. According to an embodiment, the electronic device 401 may not include at least one of the above-described components or may further include other component(s). The electronic device 401 illustrated in FIG. 4 may be identical to the first electronic device illustrated in FIG. 1 to FIG. 3, and the server 406 illustrated in FIG. 4 may be identical to the server 110 illustrated in FIG. 1 to FIG. 3.

For example, the bus 410 may interconnect the above-described components 410 to 470 and may include a circuit for conveying communications (e.g., a control message and/or data) among the above-described components.

The processor 420 may include one or more of a central processing unit (CPU), an application processor (AP), or a communication processor (CP). For example, the processor 420 may perform an arithmetic operation or data processing associated with control and/or communication of at least other components of the electronic device 401.

The memory 430 may include a volatile and/or nonvolatile memory. For example, the memory 430 may store commands or data associated with at least one other component(s) of the electronic device 401. According to an embodiment, the memory 430 may store software and/or a program 440. The program 440 may include, for example, a kernel 441, a middleware 443, an application programming interface (API) 445, and/or an application program (or "an application") 447. At least a part of the kernel 441, the middleware 443, or the API 445 may be referred to as an "operating system (OS)".

For example, the kernel 441 may control or manage system resources (e.g., the bus 410, the processor 420, the memory 430, and the like) that are used to execute operations or functions of other programs (e.g., the middleware 443, the API 445, and the application program 447). Furthermore, the kernel 441 may provide an interface that allows the middleware 443, the API 445, or the application program 447 to access discrete components of the electronic device 401 so as to control or manage system resources.

The middleware 443 may perform, for example, a mediation role such that the API 445 or the application program 447 communicates with the kernel 441 to exchange data.

Furthermore, the middleware 443 may process task requests received from the application program 447 according to a priority. For example, the middleware 443 may assign the priority, which makes it possible to use a system resource (e.g., the bus 410, the processor 420, the memory 430, or the like) of the electronic device 401, to at least one of the application program 447. For example, the middleware 443 may process the one or more task requests according to the priority assigned to the at least one, which makes it possible to perform scheduling or load balancing on the one or more task requests.

The API 445 may be, for example, an interface through which the application program 447 controls a function provided by the kernel 441 or the middleware 443, and may include, for example, at least one interface or function (e.g., an instruction) for a file control, a window control, image processing, a character control, or the like.

The input/output interface 450 may play a role, for example, of an interface which transmits a command or data input from a user or another external device, to other component(s) of the electronic device 401. Furthermore, the input/output interface 450 may output a command or data, received from other component(s) of the electronic device 401, to a user or another external device.

The display 460 may include, for example, a liquid crystal display (LCD), a light-emitting diode (LED) display, an organic LED (OLED) display, a microelectromechanical systems (MEMS) display, or an electronic paper display. The display 460 may display, for example, various contents (e.g., a text, an image, a video, an icon, a symbol, and the like) to a user. The display 460 may include a touch screen and may receive, for example, a touch, gesture, proximity, or hovering input using an electronic pen or a part of a user's body.

For example, the communication circuit 470 may establish communication between the electronic device 401 and an external device (e.g., the first electronic device 402, the second electronic device 404, or the server 406). For example, the communication circuit 470 may be connected to the network 462 over wireless communication or wired communication to communicate with the external device (e.g., the second electronic device 404 or the server 406).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UNITS), Wireless Broadband (WiBro), Global System for Mobile Communications (GSM), or the like, as cellular communication protocol. Furthermore, the wireless communication may include, for example, the short range communication 464. The short range communication 464 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 401 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 462 may include at least one of telecommunications networks, for example, a computer network (e.g., LAN or WAN), an Internet, or a telephone network.

Each of the first and second electronic devices 402 and 404 may be a device of which the type is different from or the same as that of the electronic device 401. According to an embodiment, the server 406 may include a group of one or more servers. According to various embodiments, all or a portion of operations that the electronic device 401 will perform may be executed by another or plural electronic devices (e.g., the first electronic device 402, the second electronic device 404 or the server 406). According to an embodiment, in the case where the electronic device 401 executes any function or service automatically or in response to a request, the electronic device 401 may not perform the function or the service internally, but, alternatively additionally, it may request at least a portion of a function associated with the electronic device 401 from another device (e.g., the electronic device 402 or 404 or the server 406). The other electronic device may execute the requested function or additional function and may transmit the execution result to the electronic device 401. The electronic device 401 may provide the requested function or service using the received result or may additionally process the received result to provide the requested function or service. To this end, for example, cloud computing, distributed computing, or client-server computing may be used.

Figure 5:
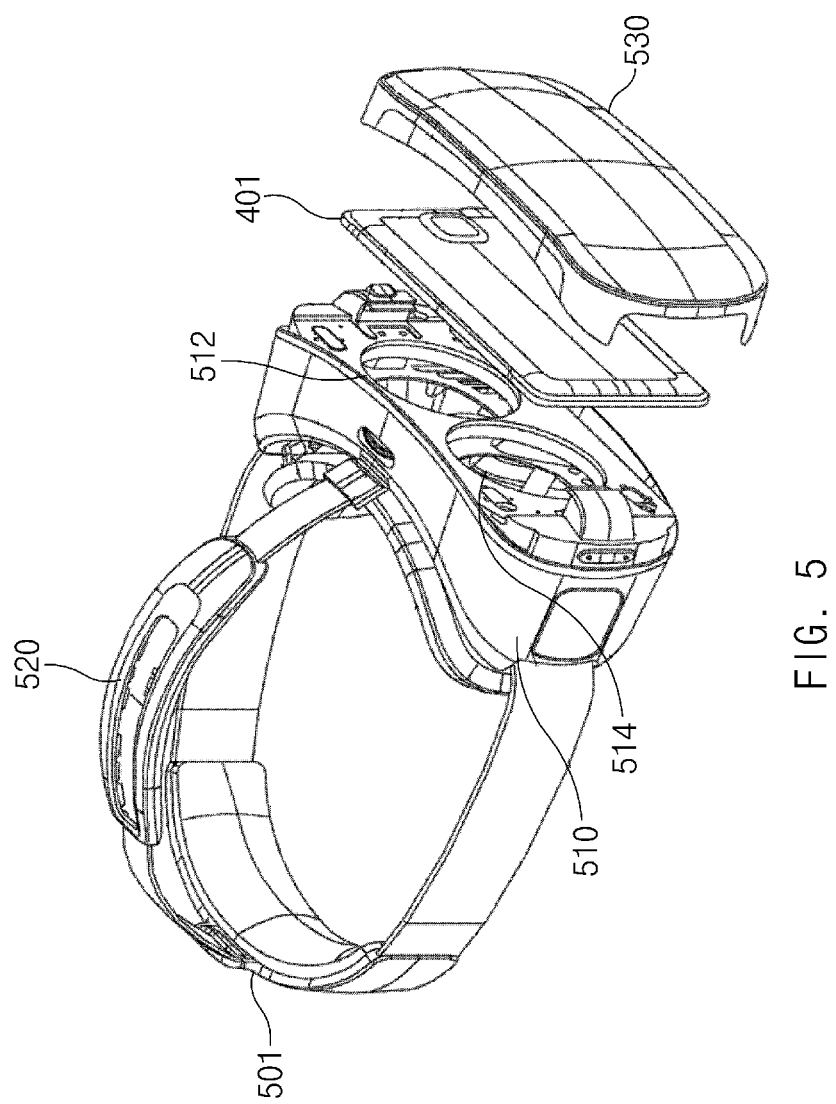
FIG. 5 illustrates an HMD device and an electronic device mounted on the HMD device, according to various embodiments.

FIG. 5 illustrates an HMD device 501 and an electronic device 401 mounted on the HMD device 501, according to various embodiments.

Referring to FIG. 5, the HMD device 501 may include a main frame 510 and a support part 520 (e.g., a goggle band). According to various embodiments, the HMD device 501 may be provided in the form of excluding a part located on the top of the head of a wearer in the support part 520 and including only a part located on a side portion of the head of the wearer.

The main frame 510 may be worn on at least a portion (e.g., a facial side) in a face of a user and may be supported on the facial side of the user by various components. A front case including a space or structure capable of combining the electronic device 401 may be formed on a front surface of the main frame 510. When the electronic device 401 is combined with the main frame 510, the user may view an image through holes 512 and 514. A left-eye lens and a right-eye lens may be arranged in the holes 512 and 514, and the lens may distort an image output from the electronic device 401.

The main frame 510 may further include a connector to communicate with the combined electronic device 401. According to various embodiments, the connector may include a component (e.g., a USB connector) capable of being connected to a communication interface (e.g., a USB port) of the electronic device 401. The connector may provide a signal, output from the electronic device 401, to the HMD device 501.

The support part 520 may adjust a length of a band which is formed of an elastic material, such that the main frame 510 is in intimate contact with the periphery of the eyes of a user's face. Cushions for providing a comfortable fit in consideration of wearing during a long time may be added to the band. The support part 520 may be configured with eyeglass temples, helmets, straps, or the like.

A cover 530 may be combined with the main frame 510. The cover 530 may additionally include a window on its front surface. The window may increase an aesthetic sense through various forms of materials, colors, and the like. The cover 530 may be made of a typical plastic material such as polycarbonate (PC) or acrylic, and may be made of a ceramic material such as glass, sapphire, or transparent ceramic. The cover 530 may be made of a metal material such as aluminum or SUB. For a transparent material, a color may be included, and transparency may be adjusted.

The electronic device 401 may be located between the main frame 510 and the cover 530. The electronic device 401 may be connected with the HMD device 501 via the communication interface, and the HMD device 501 and the electronic device 401 may transmit and receive a signal via the communication interface. When the HMD device 501 and the electronic device 401 are connected with each other, the electronic device 401 may output an image on a display 460. For example, the electronic device 401 may output an image on a region corresponding to the left-eye lens of the HMD device 501 and a region corresponding to the right-eye lens.

Figure 6:
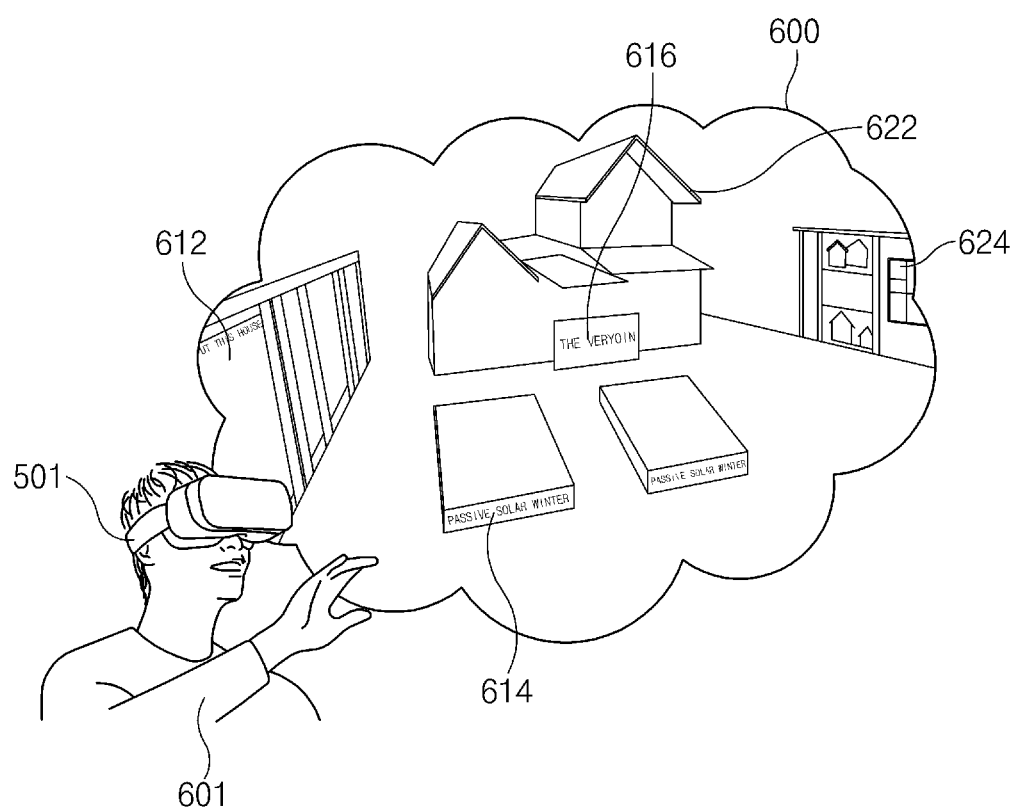
FIG. 6 illustrates objects in a virtual environment, according to various embodiments.

FIG. 6 illustrates objects in a virtual environment 600, according to various embodiments. In the disclosure, components which have the same reference denotations as those of the electronic device 401 described in FIG. 4 may also be applicable to the details described in FIG. 4.

Referring to FIG. 6, a user 601 may experience a virtual environment 600 by means of an HMD device 501. The virtual environment 600 may be an environment different from a real environment in which the user 601 exists and may be an environment executed by a program. For example, the virtual environment 600 may be a village as shown in FIG. 6 and may be a meeting room. The user 601 may feel the virtual environment 600 like the real environment and may experience events which occur in the virtual environment 600.

The virtual environment 600 may include objects. The objects may include a text type of first objects 612, 614, and 616 and a non-text type of second objects 622 and 624. In the disclosure, the first object may refer to an object where a text is written, for example, a sign or a directional sign. In FIG. 6, because the text is written on the objects 612, 614, or 616, the object 612, 614, or 616 may be the first object. The second object may refer to an object where there is no text, for example, an image, a video, or a structure. In FIG. 6, because a text is not written on the objects 622 or 624, the object 622 or 624 may be the second object.

Figure 7A:
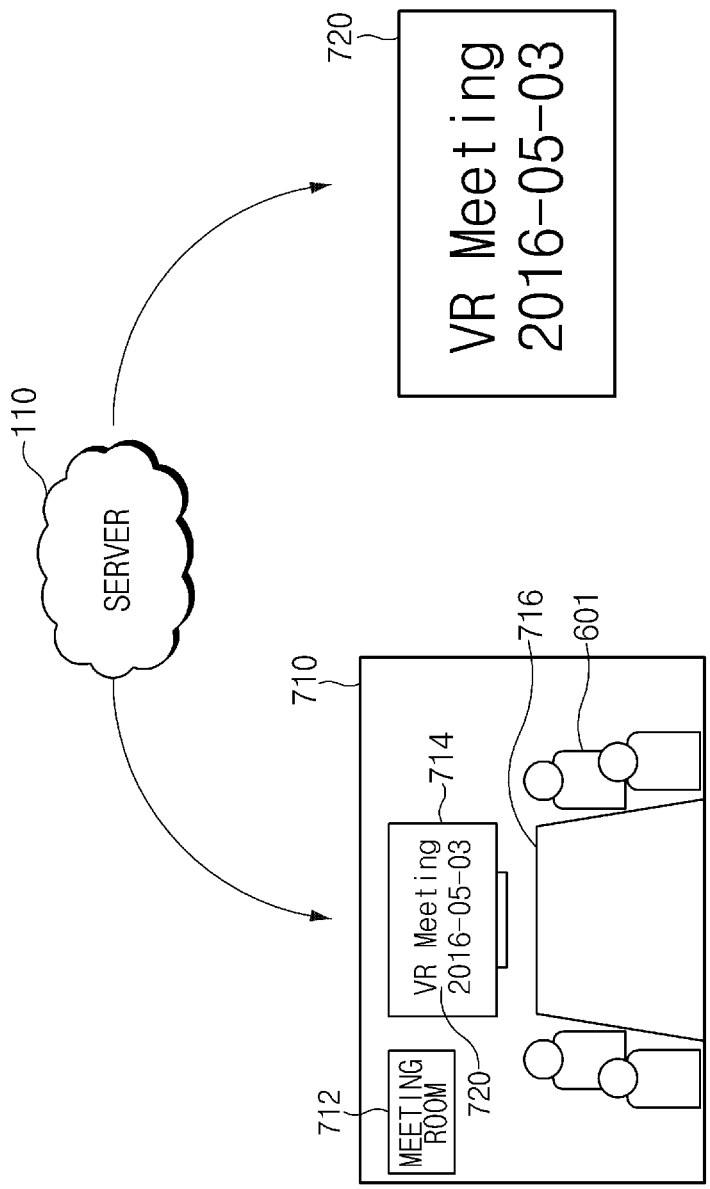
FIG. 7A illustrates a form of receiving first data including objects for implementing a virtual environment and second data from a server, according to various embodiments.

FIG. 7A illustrates a form of receiving first data including objects for implementing a virtual environment and second data from a server 110, according to various embodiments.

Referring to FIG. 7A, a communication circuit 470 may receive first data including objects for implementing a virtual environment from the server 110. When the first data is received, a processor 420 may implement the virtual environment by means of an HMD device 501, and the objects may be included in the virtual environment. For example, when the virtual environment is a meeting room, objects, such as a sign 712, a monitor 714, a table 716, and a person 601, may be located in the meeting room. Because a text is written for the sign 712, as described in FIG. 6, the sign 712 may be a first object. Because a text is not written on the monitor 714, the table 716, or the person 601, the monitor 714, the table 716, or the person 601 may be a second object.

The communication circuit 470 may receive second data 720 from the server 110. The second data 720 may be a specified document file, image file, and/or video file. For example, when the virtual environment is a meeting room, the second data 720 may be meeting materials. When the second data 720 is received, the processor 420 may output the second data 720 on the virtual environment. According to various embodiments, the processor 420 may output the second data 720 on the virtual environment such that a region where the second object is output and a region where the second data 720 is output are at least partially overlapped with each other. For example, referring to FIG. 7A, the processor 420 may be configured to output the meeting materials which are the second data 720 on the monitor 714 which is the second object.

Figure 7B:
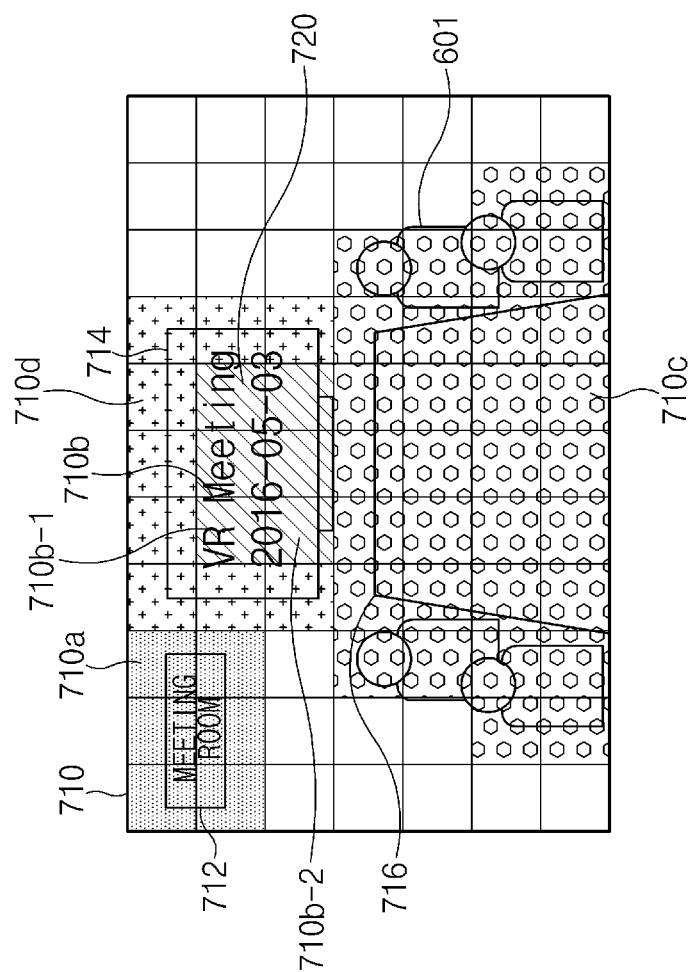
FIG. 7B illustrates a form of performing rendering in different rendering methods depending on a type of object or a type of data in a processor, according to various embodiments.

FIG. 7B illustrates a form of performing rendering in different rendering methods depending on a type of object or a type of data in a processor, according to various embodiments.

Referring to FIG. 7B, a processor 420 may divide a region 710 to be output on a display in a virtual environment into a plurality of blocks. When the region 710 to be output on the display is divided into the plurality of blocks, the processor 420 may determine at least one of the plurality of blocks as a first region 710a based on a region on which a first object is output. In FIG. 7B, because a sign 712 is a first object, the processor 420 may determine blocks where the sign 712 is output as the first region 710a. When the first region 710a is determined, the processor 420 may determine the other regions except for the first region 710a as a second region. In FIG. 7B, the other blocks except for the blocks on which the signal 712 is output may be determined as the second region.

When the first region 710a and the second region may be determined, the processor 420 may render the first region 710a in a first rendering method. In FIG. 7B, because a region where the sign 712 is output is the first region 710a, the processor 420 may render the first region 710a in the first rendering method. Unlike the first region 710a, the processor 420 may render at least a portion of the second region in a second rendering method. For example, the processor 420 may render blocks where a second object is output in the second rendering method. In FIG. 7B, because a table 716 and a person 601 are the second object, the processor 420 may render a second region 710c where the table 716 and the person 601 are output in the second rendering method.

When the first region 710a and the second region 710c are rendered, the processor 420 may output a virtual environment on the display based on the rendered first region 710a and the rendered second region 710c. For example, the processor 420 may merge the rendered first region 710a with the rendered second region 710c to output the virtual environment on the display. The first rendering method and the second rendering method may differ from each other. For example, the first rendering method may be a path-rendering method or a vector-rendering method, and the second rendering method may be a rasterization method.

According to various embodiments, the processor 420 may determine the first region 710a based on a region where the first object is output and a region where second data 720 is output. Referring to FIG. 7B, because the meeting materials are the second data 720, a region 710b where the meeting materials 720 are output may be determined as the first region. When the region 710b where the second data 720 is output is determined as the first region, the region 710b may be rendered in the first rendering method. Meanwhile, when the region 710b where the second data 720 is output and a region where the second object (e.g., a monitor 714) is output are overlapped with each other, the overlapped region 710b may be determined as the first region. For example, in FIG. 7B, when the meeting materials 720 and the monitor 714 are overlapped with each other, the region 710b where the meeting materials 720 are output may be determined as the first region and may be rendered in the first rendering method. A region 710d except for the region where the meeting materials 720 are output in the region where the monitor 714 is output may be determined as a second region and may be rendered in the second rendering method.

According to various embodiments, the processor 420 may determine blocks where the second data 720 occupies an area of greater than or equal to a predetermined rate in the block as the first region. For example, when an area where the second data 720 is occupied in a block 710b-1 is greater than or equal to the predetermined rate, the block 710b-1 may be determined as the first region. However, when an area where the second data 720 is occupied in a block 710b-2 is less than or equal to the predetermined rate, the block 710b-2 may be determined as the second region.

According to various embodiments, when the second data 720 is a specified document file, the processor 420 may determine a block including the region 710b where the second data 720 will be output as the first region. Unlike the above-mentioned embodiment, when the second data 720 is an image file or a video file, the processor 420 may determine the block including the region 710b where the second data will be output as the second region. Referring to FIG. 7B, when the second data 720 is the image file or the video file, the region 710b where the second data 720 is output may be determined as the second region together with the region where the monitor 714 is output and may be rendered in the second rendering method.

According to various embodiments, the processor 420 may render the first region 710a and the second region 710c at different periods. For example, the processor 420 may render the first region 710a at intervals of 1 µs and may render the second region 710c at intervals of 2 µs, or vice versa.

Figure 8:
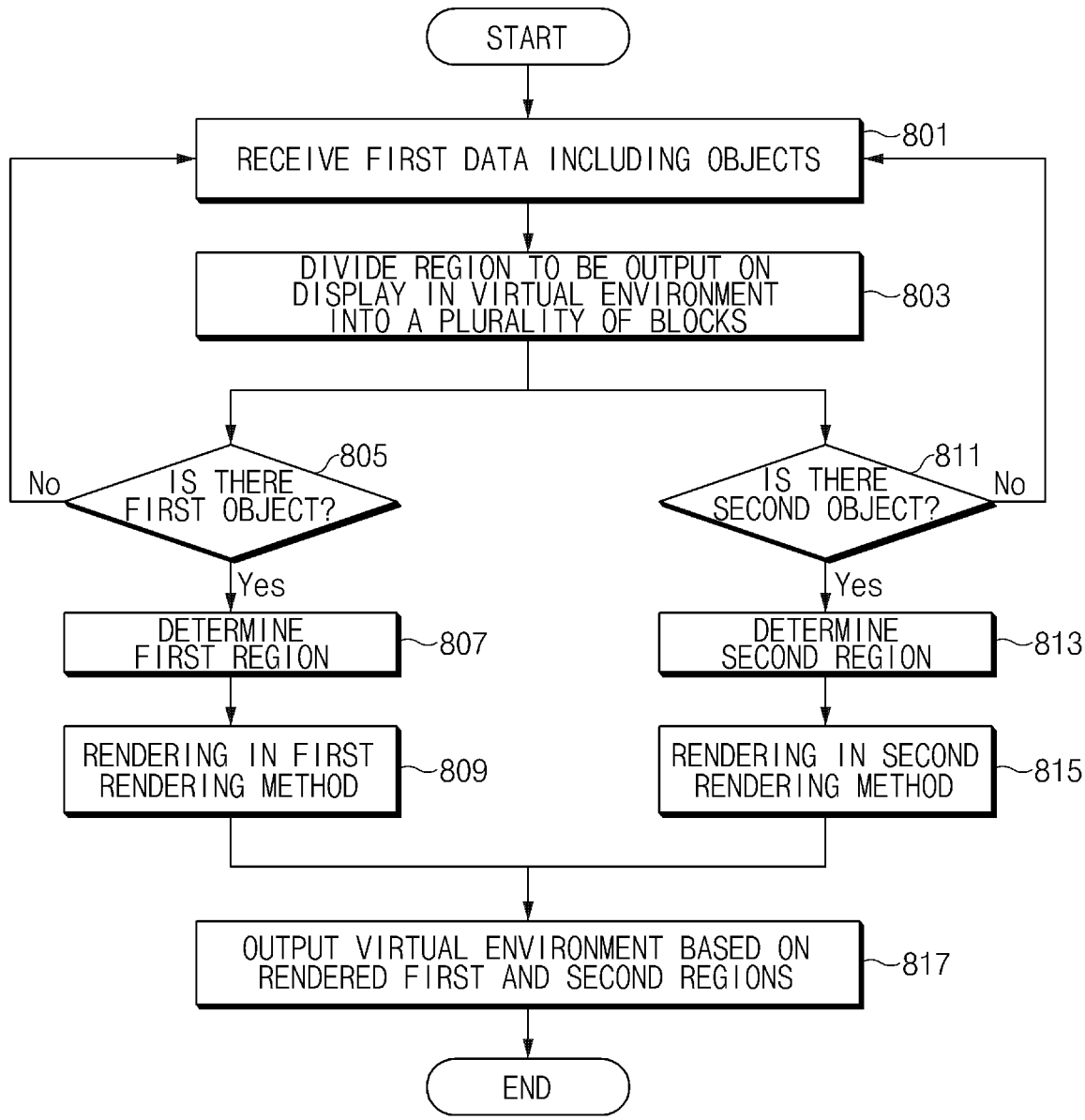
FIG. 8 illustrates an operational flowchart of an electronic device for determining a first region and a second region depending on an object and rendering the first region and the second region in different rendering methods, according to various embodiments.

FIG. 8 illustrates an operational flowchart of an electronic device for determining a first region and a second region depending on an object and rendering the first region and the second region in different rendering methods, according to various embodiments.

Referring to FIG. 8, in operation 801, a communication circuit 470 may receive first data including objects for implementing a virtual environment from a server. When the first data is received, in operation 803, the processor 420 may divide a region to be output on a display in the virtual environment into a plurality of blocks.

When the region to be output on the display is divided into the plurality of blocks, in operation 805, the processor 420 may determine whether there is a first object in the region to be output on the display. When there is the first object as a result of the determination, in operation 807, the processor 420 may determine at least one block corresponding to the region where there is the first object as a first region. When there is no the first object as a result of the determination, the communication circuit 470 may receive the first data again. When the first region is determined, in operation 809, the processor 420 may render the first region in a first rendering method.

When the region to be output on the display is divided into the plurality of blocks, in operation 811, the processor 420 may determine whether there is a second object. Operation 805 and operation 811 may be simultaneously performed, and operation 805 or operation 811 may first be performed. When there is the second object as a result of the determination, in operation 813, the processor 420 may determine at least one block corresponding to the region where there is the second object as a second region. When there is no the second object as a result of the determination, the communication circuit 470 may receive the first data again. When the second region is determined, in operation 815, the processor 420 may render the second region in a second rendering method. When the first region and the second region may be rendered in the different rendering methods, the processor 420 may output the virtual environment on the display based on the rendered first and second regions.

Figure 9A:
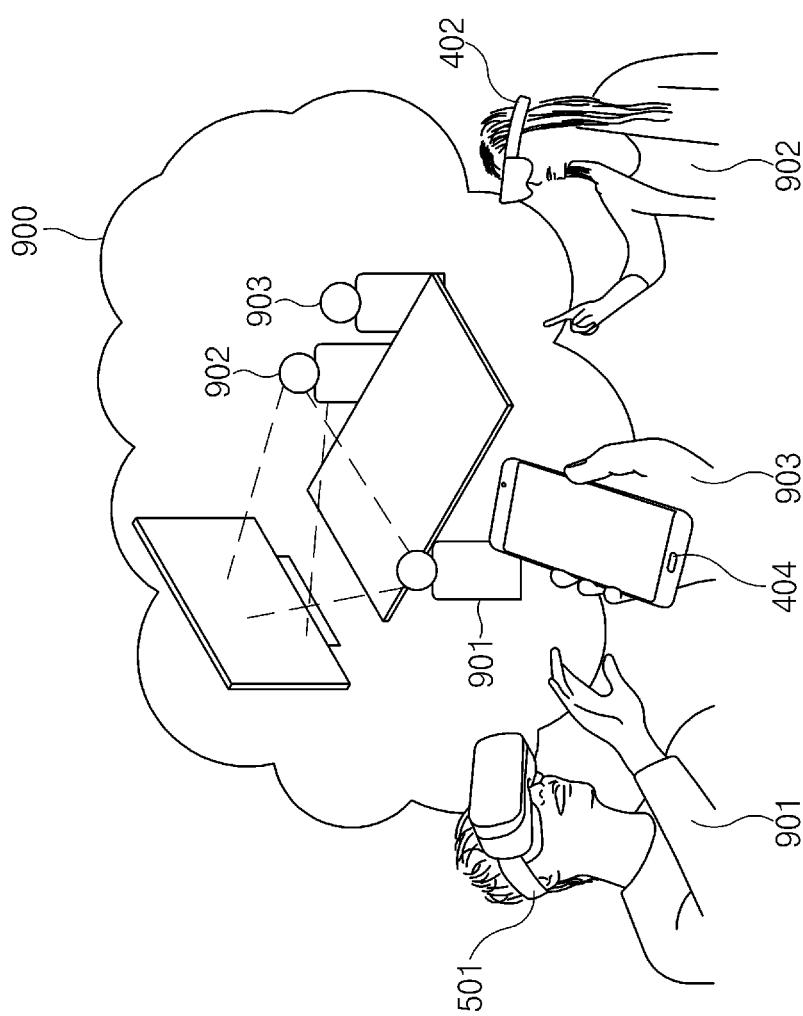
FIG. 9A illustrates an HMD device and external devices, which access a virtual environment, according to various embodiments.

FIG. 9A illustrates an HMD device 501 and external devices 402 and 404, which access a virtual environment 900, according to various embodiments.

Referring to FIG. 9A, a communication circuit 470 may receive data for implementing the virtual environment 900 implemented by a server 110 in the HMD device 501 (hereinafter referred to as "first device") from the server 110. The virtual environment 900 may be a meeting room. A first device user 901 (hereinafter referred to as "first user") and users (e.g., a second user 902 and a third user 903) of the external device 402 and 403 may access the virtual environment 900. The external devices 402 and 404 may be electronic devices which access the virtual environment 900 and may include, for example, a mobile device 120, a VR device 130, an AR device 150, or the like described in FIG. 1.

According to various embodiments, the communication circuit 470 may obtain information associated with behaviors of the external devices 402 and 404 which access the virtual environment 900. The information associated with the behaviors of the external devices 402 and 404 may vary with a behavior of the second user 902 and/or the third user 903. For example, when the second user 902 changes his or her line of sight in the virtual environment 900, the communication circuit 470 may receive information about the changed viewing angle. When the third user 903 drags and changes materials output on a display of the third device 404, the communication circuit 470 may receive information about the changed materials.

Figure 9B:
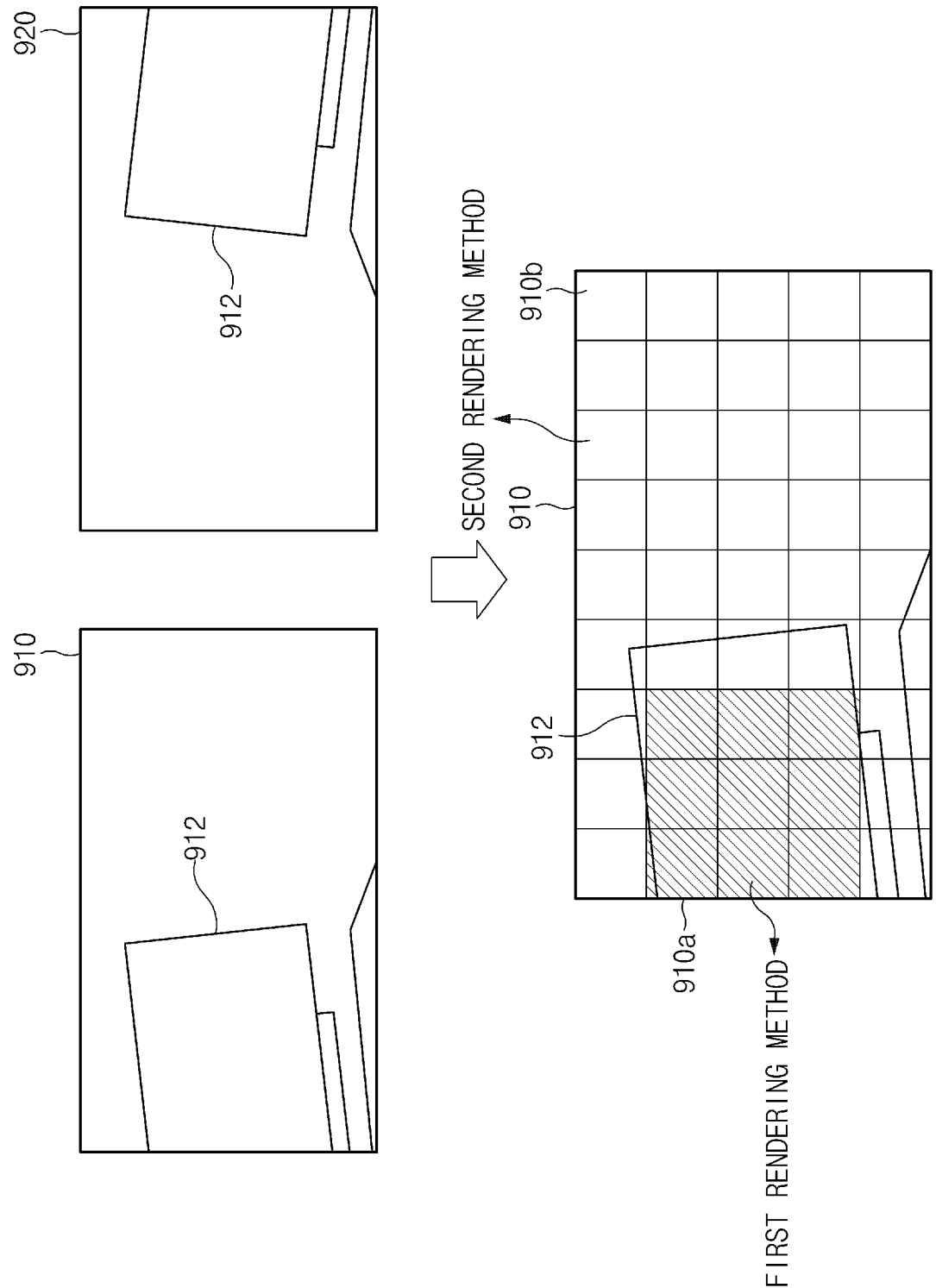
FIG. 9B illustrates an electronic device for rendering a region overlapped with a region determined based on information associated with a behavior in a region to be output on a display and the other region in different rendering methods, according to various embodiments.

FIG. 9B illustrates an electronic device for rendering a region 910a overlapped with a region 920 determined based on information associated with a behavior in a region 910 to be output on a display and the other region 910b in different rendering methods, according to various embodiments.

Referring to FIG. 9B, a processor 420 may divide the region 910 to be output on a display in a virtual environment 900 into a plurality of blocks. For example, when the virtual environment 900 is a meeting room, the region 910 to be output on the display may be a portion of the meeting room. Furthermore, the region 910 to be output on the display may include objects within a viewing angle at which a first user 901 looks.

When the region 910 to be output on the display is divided into the plurality of blocks, the processor 420 may determine at least one of the plurality of blocks as the first region 910a based on information associated with a behavior. Furthermore, the processor 420 may determine the rest of the plurality of blocks as the second region 910b. The information associated with the behavior may include information about objects within a viewing angle of a second user 902 in the virtual environment 900, information about a region to be output on a display of a second device and/or a third device, or the like.

According to various embodiments, when the region 910 to be output on the display and the region 920 determined based on the information associated with the behavior are overlapped with each other, the processor 420 may determine at least one block corresponding to the overlapped region 910a as the first region 910a. For example, in FIG. 9B, when the first user 901 looks at a monitor, the region 910 to be output on a display of a first device may include at least a portion of the monitor. Moreover, when the second user 902 looks at the monitor, the region 920 to be output on the display of the second device may include at least a portion of the monitor. Thus, the processor 420 may determine blocks, corresponding to a region where the region 910 to be output on the display of the first device and the region 920 to be output on the display of the second device are overlapped with each other, among blocks corresponding to the monitor as the first region 910a.

When the first region 910a and the second region 910b are determined, the processor 420 may render the first region 910a and the second region 910b using different rendering methods. The method for rendering the first region 910a and the second region 910b may be the same as the rendering method described in FIG. 7B. When the first region 910a and the second region 910b are rendered, the processor 420 may output the virtual environment 900 on the display based on the rendered first region 910a and the rendered second region 910b. For example, the processor 420 may merge the rendered first region 910a and the rendered second region 910b to output the virtual environment 900 on the display.

According to various embodiments, the region 910a where the region 910 to be output on the display of the first device and the region 920 to be output on the display of the second device are overlapped with each other may include a text-type object or a specified document file. The text-type object or the specified text file may be substantially the same as the text-type object or the specified document file described in FIG. 7. When the text-type object or the specified document file is included in the overlapped region 910a, the processor 420 may determine the overlapped region as the first region 910a and may determine the other region as the second region 910b. When the first region 910a and the second region 910b are determined, the processor 420 may render the first region 910a and the second region 910b using different rendering method.

Figure 10:
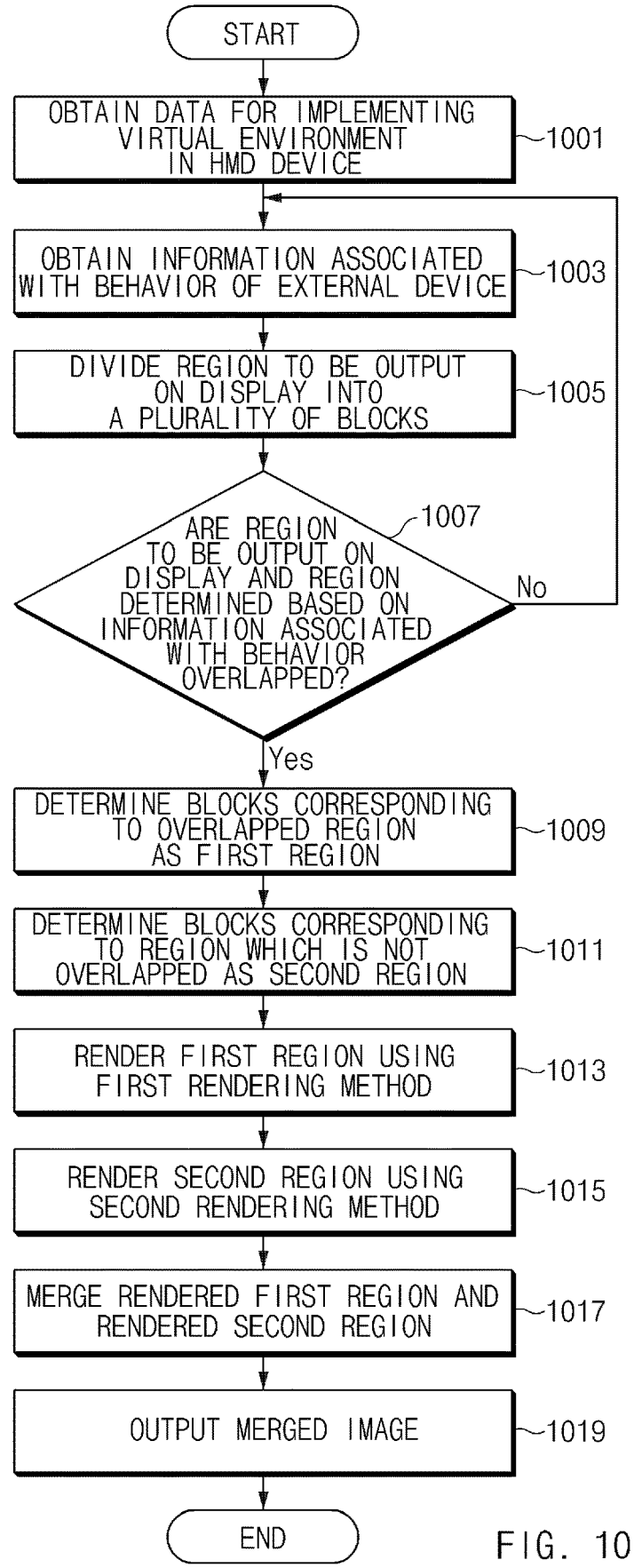
FIG. 10 illustrates an operational flowchart of an electronic device for determining a region overlapped with a region determined based on information associated with a behavior in a region output on a display as a first region and determining the other region as a second region, according to various embodiments.

FIG. 10 illustrates an operational flowchart of an electronic device for determining a region overlapped with a region determined based on information associated with a behavior in a region output on a display as a first region and determining the other region as a second region, according to various embodiments. The details described in FIGS. 9A and 9B are also applicable to components which have the same denotations as the components described in FIGS. 9A and 9B.

Referring to FIG. 10, in operation 1001, a communication circuit 470 may obtain data for implementing a virtual environment 900 implemented by a server 406 in an HMD device 501 from the server 406. When the data is obtained, in operation 1003, the communication circuit 470 may obtain information associated with behaviors, in the virtual environment 900, of external devices 402 and 404 which access the virtual environment 900. In FIG. 10, it is shown that the communication circuit 470 obtains the data and obtains the information, but the communication circuit 470 may obtains the information and obtains the data. Furthermore, the communication circuit 470 may obtain the information and the data simultaneously.

When the data and the information are obtained, in operation 1005, the processor 420 may divide a region 910 to be output on a display into a plurality of blocks. The region to be output on the display may be the same as the region to be output on the display, described in FIG. 9B.

When the region 910 to be output on the display is divided, in operation 1007, the processor 420 may determine whether the region 910 to be output on the display and a region 920 determined based on the information associated with the behavior are overlapped with each other. When they are overlapped with each other as a result of the determination, in operation 1009, the processor 420 may determine at least one block corresponding to the overlapped region as a first region 910a. In operation 1011, the processor 420 may determine the other blocks as a second region 910b. When they are not overlapped with each other as a result of the determination, the processor 420 may obtain the information associated with the behavior until the region 920 determined based on the information associated with the behavior, overlapped with the region 910 to be output on the display, is obtained.

When the first region 910a and the second region 910b are determined, the processor 420 may render the first region 910a and the second region 910b using different rendering methods. When each of the first region 910a and the second region 910b is rendered, in operation 1017, the processor 420 may merge the rendered first region 910a and the rendered second region 910b. When the rendered first region 910a and the rendered second region 710b are merged with each other, in operation 1019, the processor 420 may output a virtual environment on a region corresponding to a left-eye lens and a region corresponding to a right-eye lens on a display 460 based on the rendered image.

According to various embodiments of the disclosure, an image of clear image quality may be output and a rendering time and current consumption may be reduced by separately rendering a region overlapped with a line of sight of another user and the other region.

Figure 11:
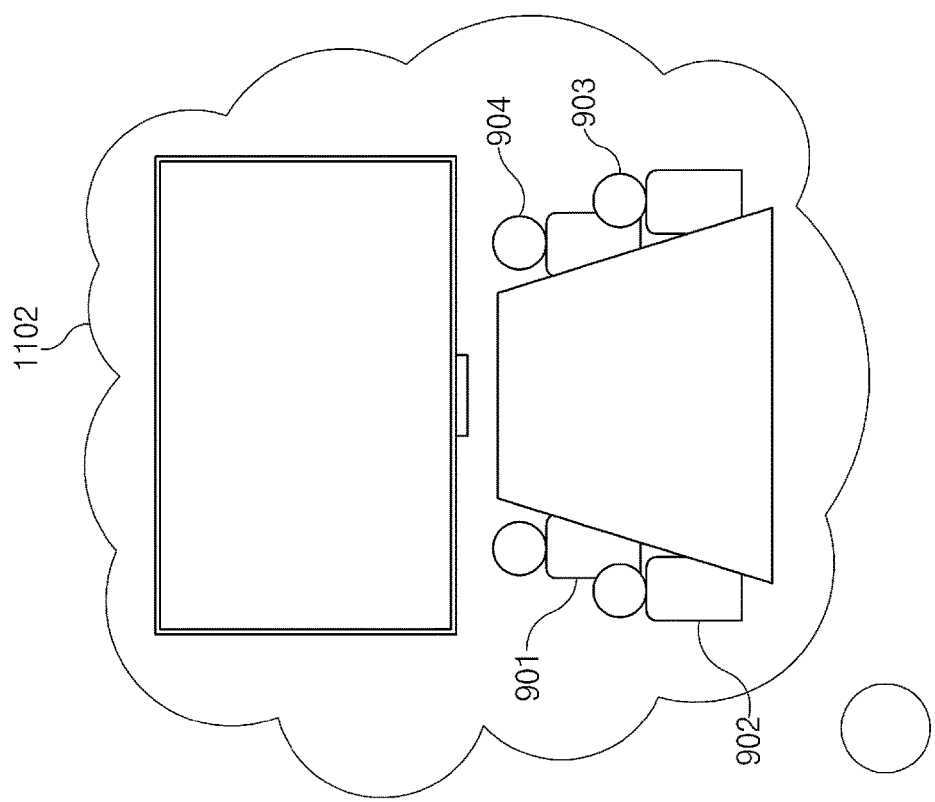
FIG. 11 illustrates a form where other users participate in an augmented environment captured by an external device, according to various embodiments.
Figure 11:
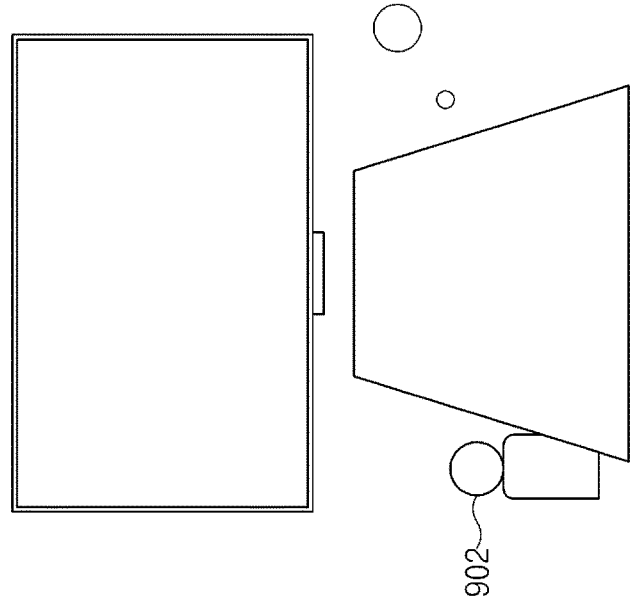

FIG. 11 illustrates a form where other users participate in an augmented environment 1102 captured by an external device 402, according to various embodiments.

Referring to FIG. 11, a communication circuit 470 may obtain first data for implementing the augmented environment 1102 captured by the external device 402 in an HMD device 501 from a server 406. The external device 402 may be the AR device 150 described in FIG. 1, and the augmented environment 1102 may be an environment captured by the AR device 150.

When the augmented environment 1102 is captured, the AR device 150 may transmit data for implementing the augmented environment 1102 in the HMD device 501 to the server 406, and the communication circuit 470 may obtain the data.

The communication circuit 470 may obtain second data for outputting contents on a specified region in the augmented environment 1102. The contents may be a text type object or a specified document file described in FIG. 7. When the first data and the second data are obtained, the processor 420 may set a first region and a second region. The process of setting the first region and the second region and rendering the respective regions in different rendering methods may be substantially the same as the process described in FIG. 7B.

According to various embodiments, a realistic augmented environment may be provided to the user of the electronic device 410 by receiving the augmented environment captured by the external device 402 from the server 406 and rendering the specified region.

An electronic device according to various embodiments of the disclosure may include a display, a communication interface configured to connect an HMD device and the electronic device, a communication circuit configured to obtain first data for implementing an augmented environment captured by an external device in the HMD device and second data for outputting contents on a specified region in the augmented environment from a server, and a processor configured to divide an image generated based on the first data into a plurality of blocks, determine at least one block including the specified region where the contents are output among the plurality of blocks as a first region and determine the rest of the plurality of blocks as a second region, render the first region and the second region using different rendering methods, and output the augmented environment on a region corresponding to a left-eye lens and a region corresponding to a right-eye lens on the display based on the rendered image.

According to various embodiments of the disclosure, the processor may be configured to project and render the first region onto a two-dimensional plane.

According to various embodiments of the disclosure, the processor may be configured to project the second region onto a two-dimensional plane to generate a planar image and distort and render the planar image.

According to various embodiments of the disclosure, the processor may be configured to merge the rendered first region and the rendered second region such that the augmented environment is output on the display.

Figure 12A:
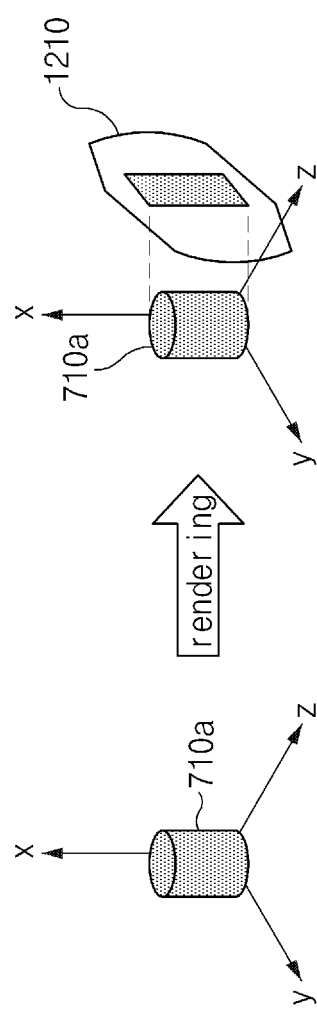
FIG. 12A illustrates an operation of projecting a three-dimensional image onto a two-dimensional distortion surface to obtain an inverse distortion image in a first rendering method, according to various embodiments.
Figure 12B:
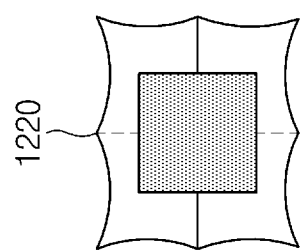
FIG. 12B illustrates an operation of passing an inverse distortion image through a lens to change the inverse distortion image to a distortion image in a first rendering method, according to various embodiments.
Figure 12B:
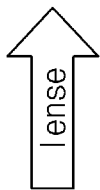
Figure 12B:
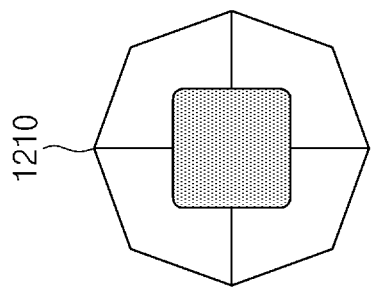
Figure 13A:
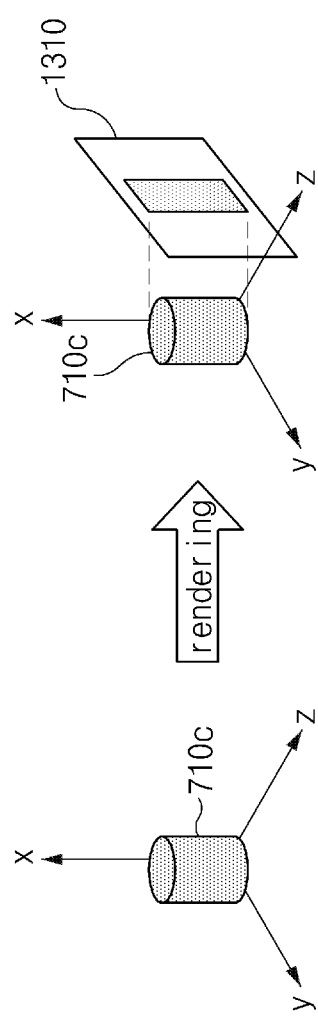
FIG. 13A illustrates an operation of projecting a three-dimensional image onto a two-dimensional plane to obtain a planar image in a second rendering method, according to various embodiments.
Figure 13B:
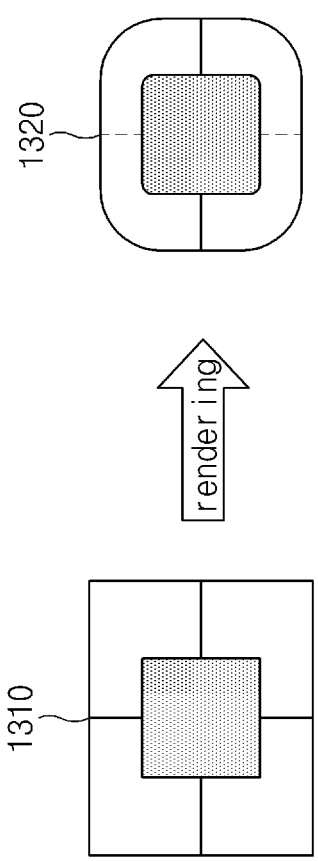
FIG. 13B illustrates an operation of rendering a planar image to obtain an inverse distortion image in a second rendering method, according to various embodiments.
Figure 13C:
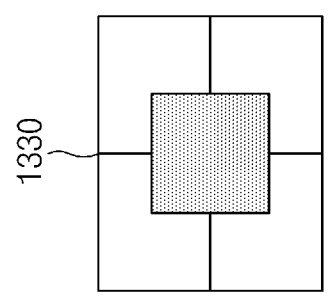
FIG. 13C illustrates an operation of passing an inverse distortion image through a lens to change the inverse distortion image to a distortion image in a second rendering method, according to various embodiments.
Figure 13C:
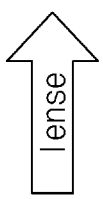
Figure 13C:
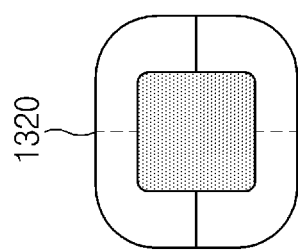

FIG. 12A illustrates an operation of projecting a three-dimensional image onto a two-dimensional distortion surface to obtain an inverse distortion image in a first rendering method, according to various embodiments. FIG. 12B illustrates an operation of passing an inverse distortion image through a lens to change the inverse distortion image to a distortion image in a first rendering method, according to various embodiments. FIG. 13A illustrates an operation of projecting a three-dimensional image onto a two-dimensional plane to obtain a planar image in a second rendering method, according to various embodiments. FIG. 13B illustrates an operation of rendering a planar image to obtain an inverse distortion image in a second rendering method, according to various embodiments. FIG. 13C illustrates an operation of passing an inverse distortion image through a lens to change the inverse distortion image to a distortion image in a second rendering method, according to various embodiments. A first rendering method and a second rendering method to be described in FIGS. 12A to 13C may be substantially the same as the first rendering method and the second rendering method described in FIGS. 6 to 11.

Referring to FIGS. 12A and 12B, a processor 420 may project a three-dimensional image 710a onto a two-dimensional distortion surface based on a distortion rate of a lens unit to obtain an inverse distortion image 1210. The three-dimensional image 710a may be the first region (e.g., the first region 710a) described in FIGS. 6 to 11, and the inverse distortion image 1210 may be an image output on a display 460. When the inverse distortion image 1201 is output on the display 460, it may pass through a lens unit mounted on an HMD device 501 to change to a distortion image 1220, and the distortion image 1220 may be provided to a user. Because the first rendering method shown in FIGS. 12A and 12B includes only one rendering process, a rendering time may be short and current consumption may be reduced.

Referring to FIGS. 13A to 13C, the processor 420 may project a three-dimensional image 710c onto a two-dimensional plane to obtain a planar image 1310. The three-dimensional image 710c may be the second region (e.g., the second region 710c) described in FIGS. 6 to 11, and the planar image 1310 may be an image obtained by rendering the second region. When the planar image 1310 is obtained, the processor 420 may render the planar image 1310 again based on the distortion rate of the lens unit to obtain an inverse distortion image 1320. For example, the processor 420 may distort the planar image 1310 to obtain the inverse distortion image 1320. The inverse distortion image 1320 may be an image output on the display 460. When the inverse distortion image 1320 is output on the display 460, it may pass through the lens unit mounted on the HMD device 501 to change to a distortion image 1330, and the distortion image 1330 may be provided to the user. Because the second rendering method shown in FIGS. 13A to 13C includes two rendering processes, there may be no error in the rendering process.

Figure 14:
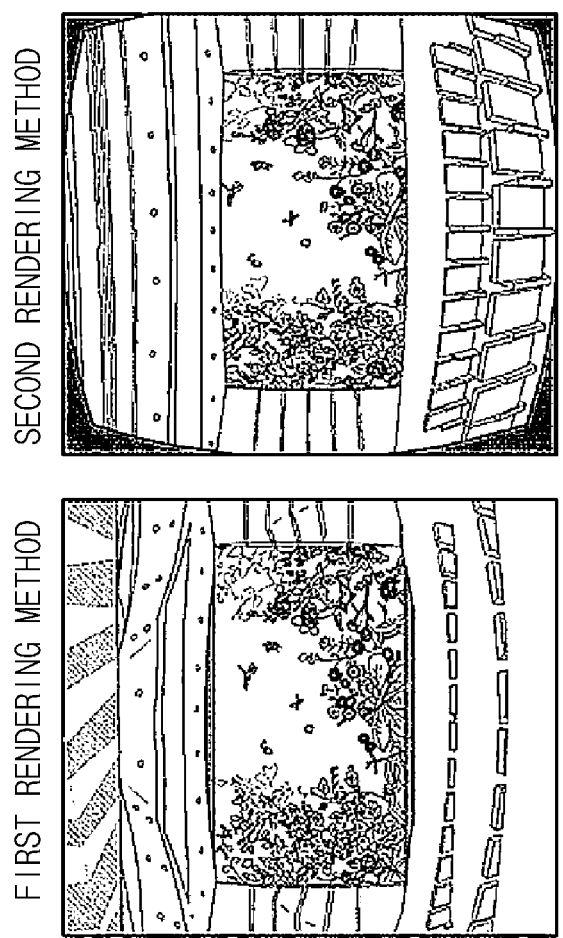
FIG. 14 illustrates images obtained by rendering images, each of which includes a geometric structure, in a first rendering method and a second rendering method, according to various embodiments.
Figure 15:
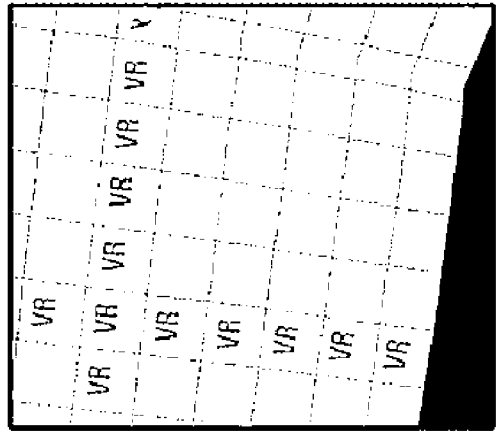
FIG. 15 illustrates images obtained by rendering images, each of which includes a character, in a first rendering method and a second rendering method, according to various embodiments.
Figure 15:
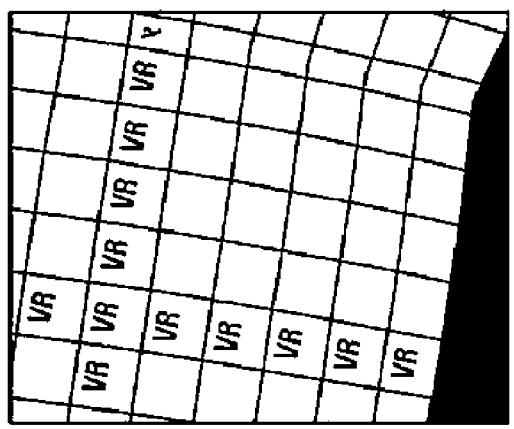

FIG. 14 illustrates images obtained by rendering images, each of which includes a geometric structure, in a first rendering method and a second rendering method, according to various embodiments. FIG. 15 illustrates images obtained by rendering images, each of which includes a character, in a first rendering method and a second rendering method, according to various embodiments.

Referring to 14, images, such as a chair and a screen, with a complex geometric structure are shown in FIG. 14. As described in FIG. 13A to 13C, because the second rendering method goes through the two rendering processes, it may be suitable when rendering the image with the complex geometric structure. For example, because an error is able to occur when the image with the complex geometric structure is rendered using one rendering process, it may be preferable to use the two rendering processes.

On the other hand, referring to FIG. 15, images, each of which has a written character and a simple structure, are shown in FIG. 15. As shown in FIG. 15, it may be more suitable to use the first rendering method in the image with the written character and the simple structure. For example, when the character is written and the structure is simple like the image shown in FIG. 15, although the image does not pass through the two rendering processes, an image of clear image quality may be obtained.

Figure 16:
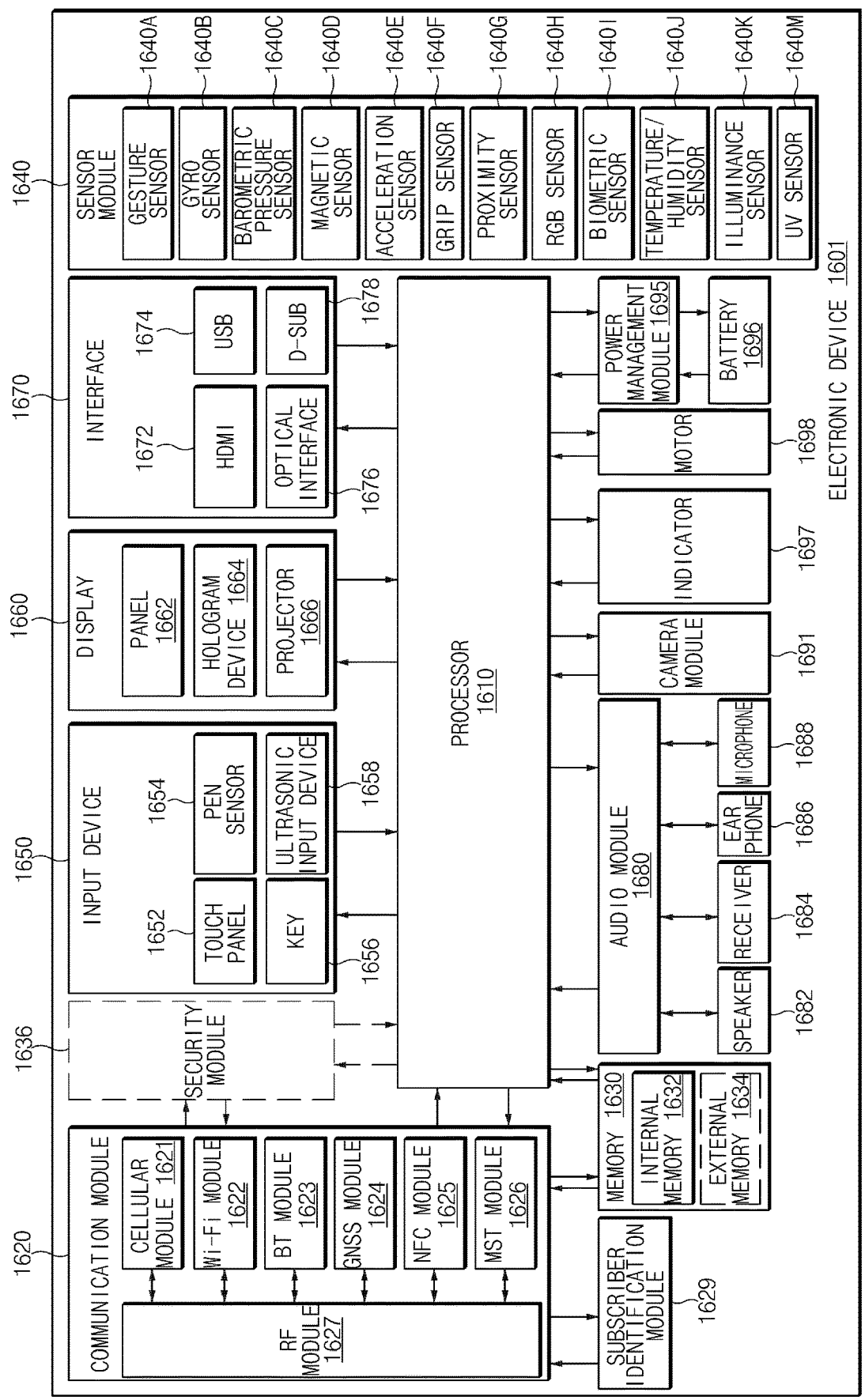
FIG. 16 illustrates a block diagram of an electronic device, according to various embodiments.

FIG. 16 illustrates a block diagram of an electronic device, according to various embodiments.

Referring to FIG. 16, an electronic device 1601 may include, for example, all or a part of the electronic device 401 illustrated in FIG. 4. The electronic device 1601 may include one or more processors (e.g., an application processor (AP)) 1610, a communication module 1620, a subscriber identification module 1629, a memory 1630, a sensor module 1640, an input device 1650, a display 1660, an interface 1670, an audio module 1680, a camera module 1691, a power management module 1695, a battery 1696, an indicator 1697, and a motor 1698.

The processor 1610 may drive, for example, an operating system (OS) or an application to control a plurality of hardware or software components connected to the processor 1610 and may process and compute a variety of data. For example, the processor 1610 may be implemented with a System on Chip (SoC). According to an embodiment, the processor 1610 may further include a graphic processing unit (GPU) and/or an image signal processor. The processor 1610 may include at least a part (e.g., a cellular module 1621) of components illustrated in FIG. 16. The processor 1610 may load a command or data, which is received from at least one of other components (e.g., a nonvolatile memory), into a volatile memory and process the loaded command or data. The processor 1610 may store a variety of data in the nonvolatile memory.

The communication module 1620 may be configured the same as or similar to the communication circuit 470 of FIG. 4. The communication module 1620 may include the cellular module 1621, a Wi-Fi module 1622, a Bluetooth (BT) module 1623, a GNSS module 1624 (e.g., a GPS module, a Glonass module, a Beidou module, or a Galileo module), a near field communication (NFC) module 1625, a MST module 1626 and a radio frequency (RF) module 1627.

The cellular module 1621 may provide, for example, voice communication, video communication, a character service, an Internet service, or the like over a communication network. According to an embodiment, the cellular module 1621 may perform discrimination and authentication of the electronic device 1601 within a communication network by using the subscriber identification module (e.g., a SIM card) 1629. According to an embodiment, the cellular module 1621 may perform at least a portion of functions that the processor 1610 provides. According to an embodiment, the cellular module 1621 may include a communication processor (CP).

Each of the Wi-Fi module 1622, the BT module 1623, the GNSS module 1624, the NFC module 1625, or the MST module 1626 may include a processor for processing data exchanged through a corresponding module, for example. According to an embodiment, at least a part (e.g., two or more) of the cellular module 1621, the Wi-Fi module 1622, the BT module 1623, the GNSS module 1624, the NFC module 1625, or the MST module 1626 may be included within one Integrated Circuit (IC) or an IC package.

For example, the RF module 1627 may transmit and receive a communication signal (e.g., an RF signal). For example, the RF module 1627 may include a transceiver, a power amplifier module (PAM), a frequency filter, a low noise amplifier (LNA), an antenna, or the like. According to another embodiment, at least one of the cellular module 1621, the Wi-Fi module 1622, the BT module 1623, the GNSS module 1624, the NFC module 1625, or the MST module 1626 may transmit and receive an RF signal through a separate RF module.

The subscriber identification module 1629 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1630 (e.g., the memory 430) may include an internal memory 1632 or an external memory 1634. For example, the internal memory 1632 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1634 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1634 may be operatively and/or physically connected to the electronic device 1601 through various interfaces.

A security module 1636 may be a module that includes a storage space of which a security level is higher than that of the memory 1630 and may be a circuit that guarantees safe data storage and a protected execution environment. The security module 1636 may be implemented with a separate circuit and may include a separate processor. For example, the security module 1636 may be in a smart chip or a secure digital (SD) card, which is removable, or may include an embedded secure element (eSE) embedded in a fixed chip of the electronic device 1601. Furthermore, the security module 1636 may operate based on an operating system (OS) that is different from the OS of the electronic device 1601. For example, the security module 1636 may operate based on java card open platform (JCOP) OS.

The sensor module 1640 may measure, for example, a physical quantity or may detect an operation state of the electronic device 1601. The sensor module 1640 may convert the measured or detected information to an electric signal. For example, the sensor module 1640 may include at least one of a gesture sensor 1640A, a gyro sensor 1640B, a barometric pressure sensor 1640C, a magnetic sensor 1640D, an acceleration sensor 1640E, a grip sensor 1640F, the proximity sensor 1640G, a color sensor 1640H (e.g., red, green, blue (RGB) sensor), a biometric sensor 1640I, a temperature/humidity sensor 1640J, an illuminance sensor 1640K, or an UV sensor 1640M. Although not illustrated, additionally or alternatively, the sensor module 1640 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1640 may further include a control circuit for controlling at least one or more sensors included therein. According to an embodiment, the electronic device 1601 may further include a processor that is a part of the processor 1610 or independent of the processor 1610 and is configured to control the sensor module 1640. The processor may control the sensor module 1640 while the processor 1610 remains at a sleep state.

The input device 1650 may include, for example, a touch panel 1652, a (digital) pen sensor 1654, a key 1656, or an ultrasonic input unit 1658. For example, the touch panel 1652 may use at least one of capacitive, resistive, infrared and ultrasonic detecting methods. Also, the touch panel 1652 may further include a control circuit. The touch panel 1652 may further include a tactile layer to provide a tactile reaction to a user.

The (digital) pen sensor 1654 may be, for example, a part of a touch panel or may include an additional sheet for recognition. The key 1656 may include, for example, a physical button, an optical key, a keypad, or the like. The ultrasonic input device 1658 may detect (or sense) an ultrasonic signal, which is generated from an input device, through a microphone (e.g., a microphone 1688) and may check data corresponding to the detected ultrasonic signal.

The display 1660 (e.g., the display 460) may include a panel 1662, a hologram device 1664, or a projector 1666. The panel 1662 may be the same as or similar to the display 460 illustrated in FIG. 4. The panel 1662 may be implemented, for example, to be flexible, transparent or wearable. The panel 1662 and the touch panel 1652 may be integrated into a single module. The hologram device 1664 may display a stereoscopic image in a space using a light interference phenomenon. The projector 1666 may project light onto a screen so as to display an image. For example, the screen may be arranged in the inside or the outside of the electronic device 1601. According to an embodiment, the display 1660 may further include a control circuit for controlling the panel 1662, the hologram device 1664, or the projector 1666.

The interface 1670 may include, for example, a high-definition multimedia interface (HDMI) 1672, a universal serial bus (USB) 1674, an optical interface 1676, or a D-subminiature (D-sub) 1678. The interface 1670 may be included, for example, in the communication circuit 470 illustrated in FIG. 4. Additionally or alternatively, the interface 1670 may include, for example, a mobile high definition link (MHL) interface, a SD card/multi-media card (MMC) interface, or an infrared data association (IrDA) standard interface.

The audio module 1680 may convert a sound and an electric signal in dual directions. At least a component of the audio module 1680 may be included, for example, in the input/output interface 450 illustrated in FIG. 4. The audio module 1680 may process, for example, sound information that is input or output through a speaker 1682, a receiver 1684, an earphone 1686, or the microphone 1688.

For example, the camera module 1691 may shoot a still image or a video. According to an embodiment, the camera module 1691 may include at least one or more image sensors (e.g., a front sensor or a rear sensor), a lens, an image signal processor (ISP), or a flash (e.g., an LED or a xenon lamp).

The power management module 1695 may manage, for example, power of the electronic device 1601. According to an embodiment, a power management integrated circuit (PMIC), a charger IC, or a battery or fuel gauge may be included in the power management module 1695. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1696 and a voltage, current or temperature thereof while the battery is charged. The battery 1696 may include, for example, a rechargeable battery and/or a solar battery.

The indicator 1697 may display a specific state of the electronic device 1601 or a part thereof (e.g., the processor 1610), such as a booting state, a message state, a charging state, and the like. The motor 1698 may convert an electrical signal into a mechanical vibration and may generate the following effects: vibration, haptic, and the like. Although not illustrated, a processing device (e.g., a GPU) for supporting a mobile TV may be included in the electronic device 1601. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 17:
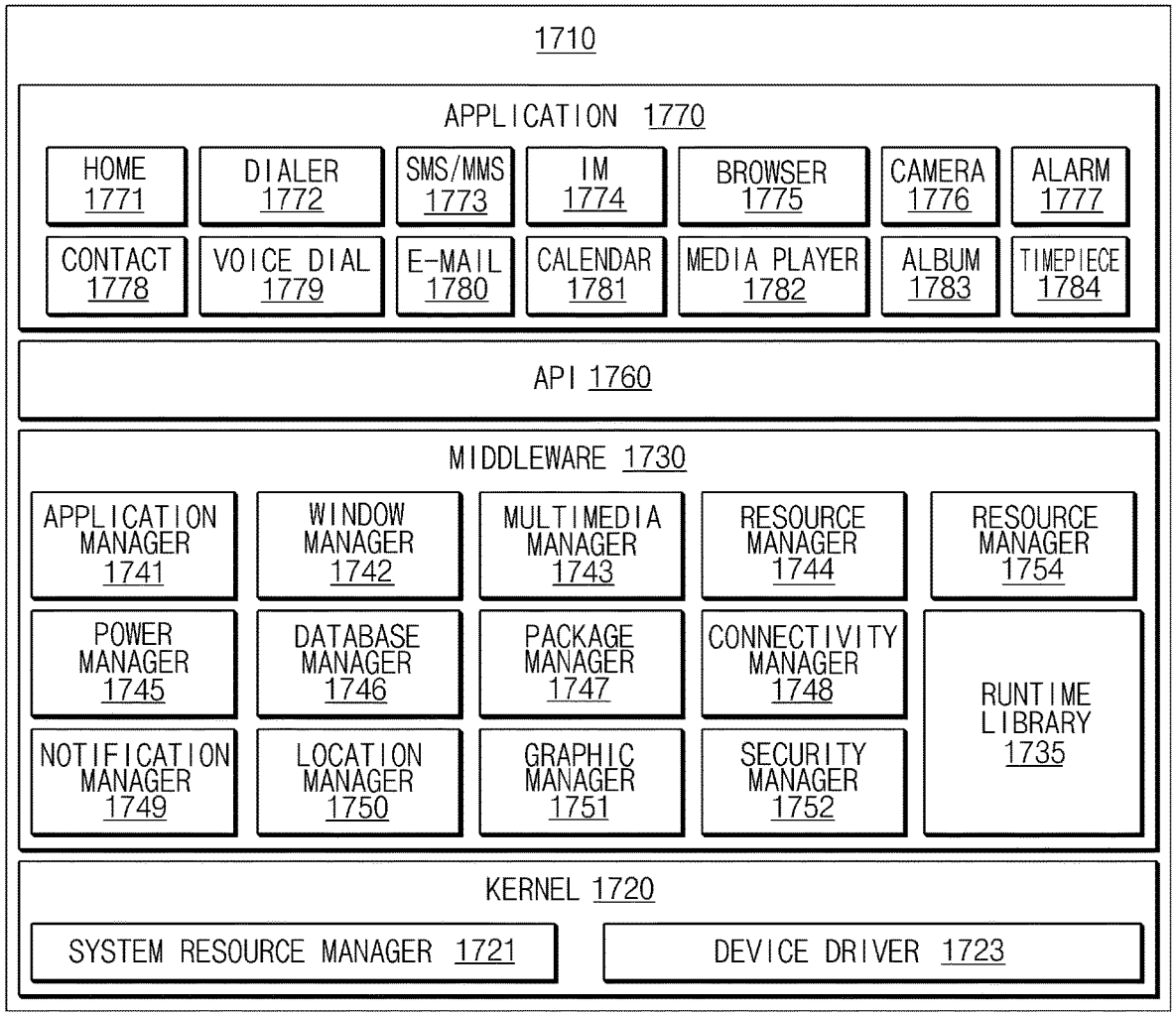
FIG. 17 illustrates a block diagram of a program module, according to various embodiments.

FIG. 17 illustrates a block diagram of a program module, according to various embodiments.

According to an embodiment, a program module 1710 (e.g., the program 440) may include an operating system (OS) to control resources associated with an electronic device (e.g., the electronic device 401), and/or diverse applications (e.g., the application program 447) driven on the OS. The OS may be, for example, Android™, iOS™, Windows™, Symbian™, or Tizen™.

The program module 1710 may include a kernel 1720, a middleware 1730, an application programming interface (API) 1760, and/or an application 1770. At least a portion of the program module 1710 may be preloaded on an electronic device or may be downloadable from an external electronic device (e.g., the first electronic device 402, the second electronic device 404, the server 406, or the like).

The kernel 1720 (e.g., the kernel 441) may include, for example, a system resource manager 1721 or a device driver 1723. The system resource manager 1721 may perform control, allocation, or retrieval of system resources. According to an embodiment, the system resource manager 1721 may include a process managing unit, a memory managing unit, or a file system managing unit. The device driver 1723 may include, for example, a display driver, a camera driver, a Bluetooth driver, a shared memory driver, a USB driver, a keypad driver, a Wi-Fi driver, an audio driver, or an inter-process communication (IPC) driver.

The middleware 1730 may provide, for example, a function that the application 1770 needs in common, or may provide diverse functions to the application 1770 through the API 1760 to allow the application 1770 to efficiently use limited system resources of the electronic device. According to an embodiment, the middleware 1730 (e.g., the middleware 443) may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, a security manager 1752, or a payment manager 1754.

The runtime library 1735 may include, for example, a library module that is used by a compiler to add a new function through a programming language while the application 1770 is being executed. The runtime library 1735 may perform input/output management, memory management, or capacities about arithmetic functions.

The application manager 1741 may manage, for example, a life cycle of at least one application of the application 1770. The window manager 1742 may manage a graphic user interface (GUI) resource that is used in a screen. The multimedia manager 1743 may identify a format necessary for playing diverse media files, and may perform encoding or decoding of media files by using a codec suitable for the format. The resource manager 1744 may manage resources such as a storage space, memory, or source code of at least one application of the application 1770.

The power manager 1745 may operate, for example, with a basic input/output system (BIOS) to manage a battery or power, and may provide power information for an operation of an electronic device. The database manager 1746 may generate, search for, or modify database that is to be used in at least one application of the application 1770. The package manager 1747 may install or update an application that is distributed in the form of package file.

The connectivity manager 1748 may manage, for example, wireless connection such as Wi-Fi or Bluetooth. The notification manager 1749 may display or notify an event such as arrival message, appointment, or proximity notification in a mode that does not disturb a user. The location manager 1750 may manage location information about an electronic device. The graphic manager 1751 may manage a graphic effect that is provided to a user, or manage a user interface relevant thereto. The security manager 1752 may provide a general security function necessary for system security, user authentication, or the like. According to an embodiment, in the case where an electronic device (e.g., the electronic device 401) includes a telephony function, the middleware 1730 may further include a telephony manager for managing a voice or video call function of the electronic device.

The middleware 1730 may include a middleware module that combines diverse functions of the above-described components. The middleware 1730 may provide a module specialized to each OS kind to provide differentiated functions. Additionally, the middleware 1730 may dynamically remove a part of the preexisting components or may add new components thereto.

The API 1760 (e.g., the API 445) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1770 (e.g., the application program 447) may include, for example, one or more applications capable of providing functions for a home 1771, a dialer 1772, an SMS/MMS 1773, an instant message (IM) 1774, a browser 1775, a camera 1776, an alarm 1777, a contact 1778, a voice dial 1779, an e-mail 1780, a calendar 1781, a media player 1782, an album 1783, a timepiece 1784, or for offering health care (e.g., measuring an exercise quantity, blood sugar, or the like) or environment information (e.g., information of barometric pressure, humidity, temperature, or the like).

According to an embodiment, the application 1770 may include an application (hereinafter referred to as "information exchanging application" for descriptive convenience) to support information exchange between an electronic device (e.g., the electronic device 401) and an external electronic device (e.g., the first electronic device 402 or the second electronic device 404). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1770 may include an application (e.g., a health care application of a mobile medical device) that is assigned in accordance with an attribute of an external electronic device. According to an embodiment, the application 1770 may include an application that is received from an external electronic device (e.g., the first electronic device 402, the second electronic device 404, or the server 406). According to an embodiment, the application 1770 may include a preloaded application or a third party application that is downloadable from a server. The names of components of the program module 1710 according to the embodiment may be modifiable depending on kinds of operating systems.

According to various embodiments, at least a portion of the program module 1710 may be implemented by software, firmware, hardware, or a combination of two or more thereof. At least a portion of the program module 1710 may be implemented (e.g., executed), for example, by the processor (e.g., the processor 1610). At least a portion of the program module 1710 may include, for example, modules, programs, routines, sets of instructions, processes, or the like for performing one or more functions.

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 420), may cause the one or more processors to perform a function corresponding to the instruction. The computer-readable storage media, for example, may be the memory 430.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

We claim:

1. An apparatus for generating an image to be displayed through a lens unit, the apparatus comprising:
    a display;
    a communication circuit; and
    a processor,
    wherein the processor is configured to:
    control the communication circuit to receive first data including objects for implementing a virtual environment from a server, wherein the objects including a text type of first object and a non-text type of second object;

divide a region where the first data is to be output on the display in the virtual environment into a plurality of blocks;

determine whether the first objects or the second object exists in each of the plurality of blocks;

determine at least one block in which the first object exists, among the plurality of blocks, as a first region, and determine at least one block in which the second object exists, among the plurality of blocks, as a second region;

render the first region in a first rendering method and render at least a portion of the second region in a second rendering method; and output the virtual environment on the display based on the rendered first region and the at least rendered portion of the second region.

2. The electronic device of claim 1, wherein the virtual environment includes a region where second data received from the server is output, and wherein the processor is configured to determine the first region based on the region where the first object is output and the region where the second data is output.

3. The electronic device of claim 2, wherein a region where the second object is output and the region where second data is output are at least partially overlapped with each other.

4. The electronic device of claim 2, wherein the processor is configured to:

determine blocks where the second data occupies an area of greater than or equal to a predetermined occupied rate in a block as the first region.

5. The electronic device of claim 1, wherein the second object includes at least one of an image, a video, or a structure.

6. The electronic device of claim 1, wherein the virtual environment includes a region where second data is output, and wherein the processor is configured to:

when the second data is a specified document file, determine blocks including a region where the second data will be output as the first region.

7. The electronic device of claim 6, wherein the processor is configured to:

when the second data is an image file or a video file, determine blocks including a region where the second data will be output as the second region.

8. The electronic device of claim 1, wherein the processor is configured to:

project and render the first region onto a two-dimensional distortion surface based on a distortion rate of the lens unit.

9. The electronic device of claim 1, wherein the processor is configured to:

generate a planar image by projecting the second region onto a two-dimensional plane; and render the planar image based on a distortion rate of the lens unit.

10. The electronic device of claim 1, wherein the processor is configured to:

render the first region and the second region at different periods.

11. The electronic device of claim 1, wherein the processor is configured to:

merge the rendered first region and the at least rendered portion of the second region such that the virtual environment is output on the display.

12. A non-transitory computer-readable storage medium instructions, the instructions, when executed by an electronic device, causing the electronic device to:

implement a virtual environment from a server and receive first data including objects including a text type of first object and a non-text type of second object;

divide a region to be output on a display in the virtual environment into a plurality of blocks;

determine whether the first object or the second object exists in each of the plurality of blocks;

determine at least one block in which the first object exists, among the plurality of blocks, as a first region, and determine at least one block in which the second object exists, among the plurality of blocks, as a second region;

render the first region in a first rendering method and render at least a portion of the second region in a second rendering method; and output the virtual environment on the display based on the rendered first region and the at least rendered portion of the second region.

13. The storage medium of claim 12, wherein the virtual environment includes a region where second data received from the server is output, and wherein the instructions cause the electronic device to further determine the first region based on the region where the first object is output and the region where the second data is output.

14. The storage medium of claim 12, wherein the virtual environment includes a region where second data is output, and wherein the instructions cause the electronic device to:

when the second data is a specified document file, further determine blocks including a region where the second data will be output as the first region.

15. The storage medium of claim 14, wherein the instructions cause the electronic device to:

when the second data is an image file or a video file, determine a block including a region where the second data will be output as the second region.

* * * * *